United States Patent [19]

Durkos et al.

[11] Patent Number: 4,777,590
[45] Date of Patent: Oct. 11, 1988

[54] PORTABLE COMPUTER

[75] Inventors: Larry G. Durkos, Lebanon; Duaine O. Taylor, Carmel; Timothy E. Franklin, Zionsville, all of Ind.

[73] Assignee: Pictorial, Inc., Indianapolis, Ind.

[21] Appl. No.: 738,671

[22] Filed: May 28, 1985

Related U.S. Application Data

[63] Continuation-in-part of Ser. No. 665,747, Oct. 27, 1984, abandoned.

[51] Int. Cl.⁴ ............................................. G06F 15/02
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,639,912 | 2/1972 | Campbell | 364/200 |
| 4,001,786 | 1/1977 | Boehm . | |
| 4,025,903 | 5/1977 | Kaufman et al. . | |
| 4,296,467 | 10/1981 | Nibby et al. . | |
| 4,379,326 | 4/1983 | Anastas et al. . | |
| 4,587,634 | 5/1986 | Ferrio et al. | 364/900 |

Primary Examiner—David Y. Eng
Attorney, Agent, or Firm—Barnes & Thornburg

[57] ABSTRACT

A computer system has a system bus with several sockets or slots therein which receive memory modules. Each module can be used to implement at least one of a variety of functions. The functions include operating system programs, application programs, and random access memories (RAM). Each slot has a module select line coupled to it at the same location. A module select circuit is provided which enables the module select lines to select the appropriate module or modules. Modules implementing the same type of function, or different functions, can be plugged into the slots in any order. Each module implementing the same type of function is allocated the same address block and starts at the same address. In the cases of operating system modules and application program modules, the module which is enabled by the module select line acts as the program memory for the processor so that the program is instantaneously in memory from the time the module is selected. The computer system of the instant invention does not load a program from a storage medium into memory and then execute it. In the case of a RAM module, the selected module becomes a memory for the processor when selected and the processor can access the RAM module to store and retrieve data.

25 Claims, 27 Drawing Sheets

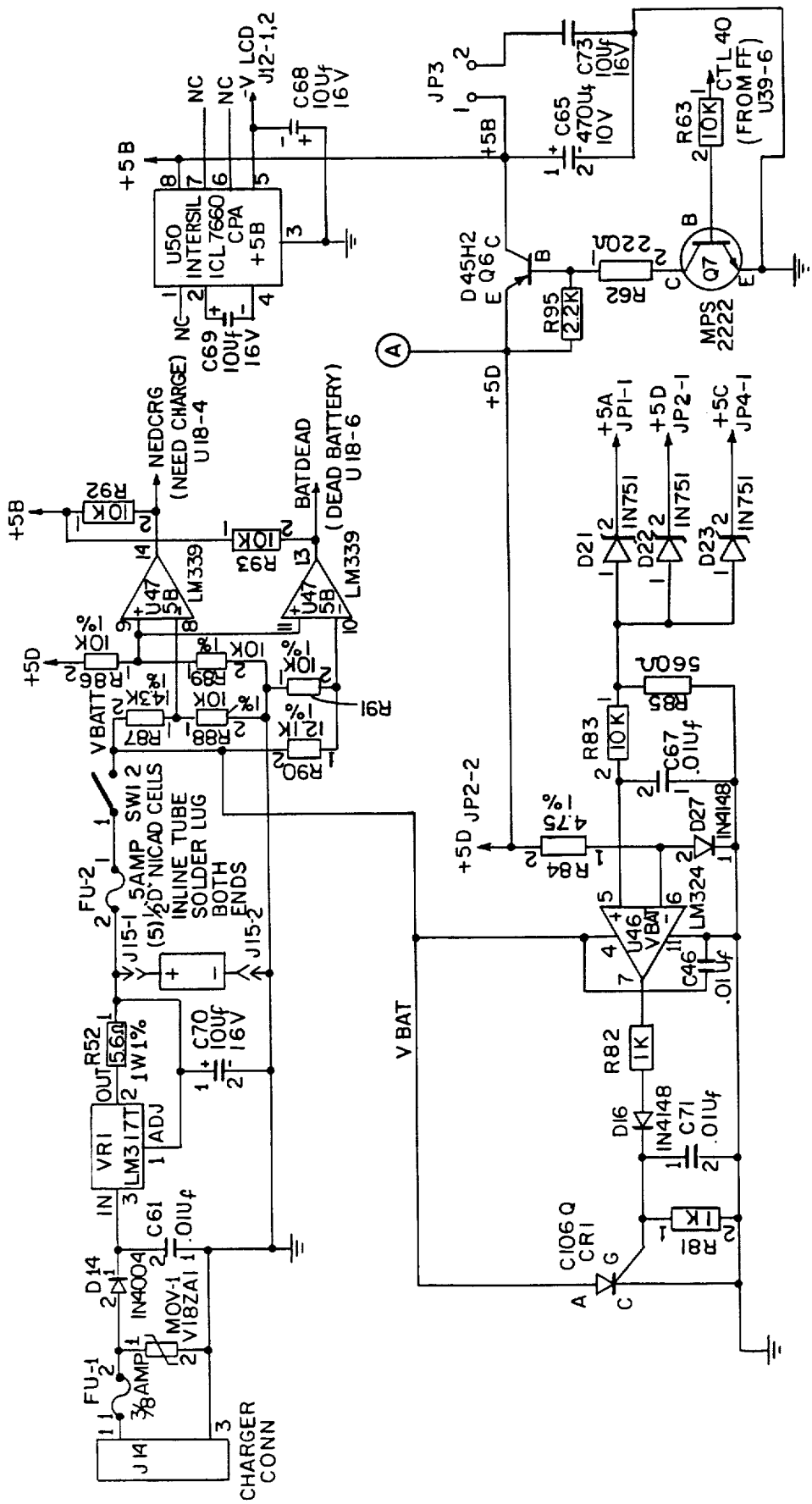
FIG. 11Ø

*FIG.11m*    FOR CONNECTORS J1 THRU J7
MAIN BUSS

| | SIDE B | | | SIDE A | |
|---|---|---|---|---|---|
| PIN NO | 1 | +5A VOLTS | PIN NO | 1 | VRAM +5D VOLTS |
| | 2 | +5A VOLTS | | 2 | VPP +5A VOLTS |
| | 3 | PGM (+5A) | | 3 | MWRT |
| | 4 | MA7 | | 4 | MA12 |
| | 5 | MA8 | | 5 | MA6 |
| | 6 | MA9 | | 6 | MA5 |
| | 7 | MA11 | | 7 | MA4 |
| | 8 | MRD | | 8 | MA3 |
| | 9 | MA10 | | 9 | MA2 |
| | 10 | RESET-4 | | 10 | MA1 |
| | 11 | MD7 | | 11 | MA0 |
| | 12 | MD6 | | 12 | MD0 |
| | 13 | MD5 | | 13 | MD1 |
| | 14 | MD4 | | 14 | MD2 |
| | 15 | MD3 | | 15 | GND |
| | 16 | MA13 | | 16 | GND |
| | 17 | MA14 | | 17 | OSEN |
| | 18 | MA15 | | 18 | RAMEN |
| | 19 | MA16 | | 19 | APEN |
| | 20 | MA17 | | 20 | INTA |
| | 21 | MA18 | | 21 | INTR |
| | 22 | MA19 | | 22 | MODEL |

FOR CONNECTOR J-8
I/O BUSS

| | SIDE B | | | SIDE A | |
|---|---|---|---|---|---|
| PIN NO | 1 | +5A VOLTS | PIN NO | 1 | VRAM +5D VOLTS |
| | 2 | +5A VOLTS | | 2 | VPP +5A VOLTS |
| | 3 | PGM (+5A) | | 3 | MWRT |
| | 4 | MA7 | | 4 | MA12 |
| | 5 | MA8 | | 5 | MA6 |
| | 6 | MA9 | | 6 | MA5 |
| | 7 | MA11 | | 7 | MA4 |
| | 8 | MRD | | 8 | MA3 |
| | 9 | MA10 | | 9 | MA2 |
| | 10 | RESET-4 | | 10 | MA1 |
| | 11 | MD7 | | 11 | MA0 |
| | 12 | MD6 | | 12 | MD0 |
| | 13 | MD5 | | 13 | MD1 |
| | 14 | MD4 | | 14 | MD2 |
| | 15 | MD3 | | 15 | GND |
| | 16 | MA13 | | 16 | GND |
| | 17 | MA14 | | 17 | I IO WR |
| | 18 | MA15 | | 18 | RAMEN |
| | 19 | MA16 | | 19 | APEN |
| | 20 | MA17 | | 20 | INTA |
| | 21 | IIO RD | | 21 | INTR |
| | 22 | POW-CALL | | 22 | MODSEL |

PORTABLE COMPUTER

This is a continuation-in-part of application Ser. No. 665,747 filed Oct. 27, 1984, now abandoned.

This application relates to computers and in particular to small, portable, hand-held computers.

In recent times, several small, relatively inexpensive computer systems have become available. Most of these computer systems are modeled after large, main frame computers used in the data processing industry. That is, these computer systems typically use a storage medium such as a disk drive to store the programs to be executed. When a particular program is needed, commands are entered into the computer, typically through a keyboard, which directs the computer to load the program from the disk drive into its memory and then execute the program. Generally, several commands are required to be entered in the proper sequence in order to load and run a program successfully.

At the extreme low end of the small computer scale are programmable calculators. These calculators permit programs to be loaded into a dynamic memory either through keystrokes from a keyboard or from a magnetic storage medium such as a small magnetic card. The calculator can then execute the program as desired. The calculator, however, can only execute the program which has been entered into its memory. Further, there is typically no capability provided for passing data from one program to another program.

Small, general purpose computers and programmable calculators have filled a need that businesses, and particularly small businesses, have had for computing power. However, these devices are greatly limited when applied to specific segments of the business world, such as financial services or insurance. This is due to the fact that these devices are general purpose devices. They have been designed in an attempt to provide considerable flexibility for a large segment of the computer market. Programs must be provided for these general purpose devices on effective storage media. Further, in order to switch back and forth between programs and pass data therebetween, some degree of expertise in using computer systems is generally required of the user. Additionally, since small, general purpose systems typically load programs from disks, for example, there is generally a delay of several seconds while a program is being loaded from disk or other storage to the memory.

It is an object of this invention to provide a simple, inexpensive computer capable of being easily customized for the particular purpose for which it is intended.

It is a further object of the invention to provide a computer which permits relatively instantaneous changes from one program to another.

It is further an object of the present invention to provide a computer system which permits data generated by one program to be easily, and in a transparent fashion, used by a second program.

A computer system in accordance with the instant invention has a system bus with several sockets or slots therein which receive memory modules. Each module can be used to implement at least one of a variety of functions. Illustratively, the functions can include an operating system program, an application program, and random access memory (RAM). Each slot has a module select line coupled to it at the same location. A module select means is provided which enables the module select lines to select the appropriate module or modules. A plurality of modules implementing different functions can be simultaneously received in the slots. Further, in a preferred embodiment, a plurality of modules implementing different application programs can be simultaneously received in the slots. Each module implementing the same type of function is allocated the same address block and starts at the same address. In the cases of operating system modules and application program modules, the module which is enabled by the module select line acts as the program memory for the processor of the present invention so that the program is instantaneously in memory from the time the module is selected. The computer system of the instant invention does not load a program from a storage medium into memory and then execute it. In the case of a RAM module, the selected module becomes a memory for the processor when selected and the processor can access the RAM module to retrieve and store data.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIGS. 11a–11m illustrate circuit schematics for a processor board according to the present invention;

Figure 1:
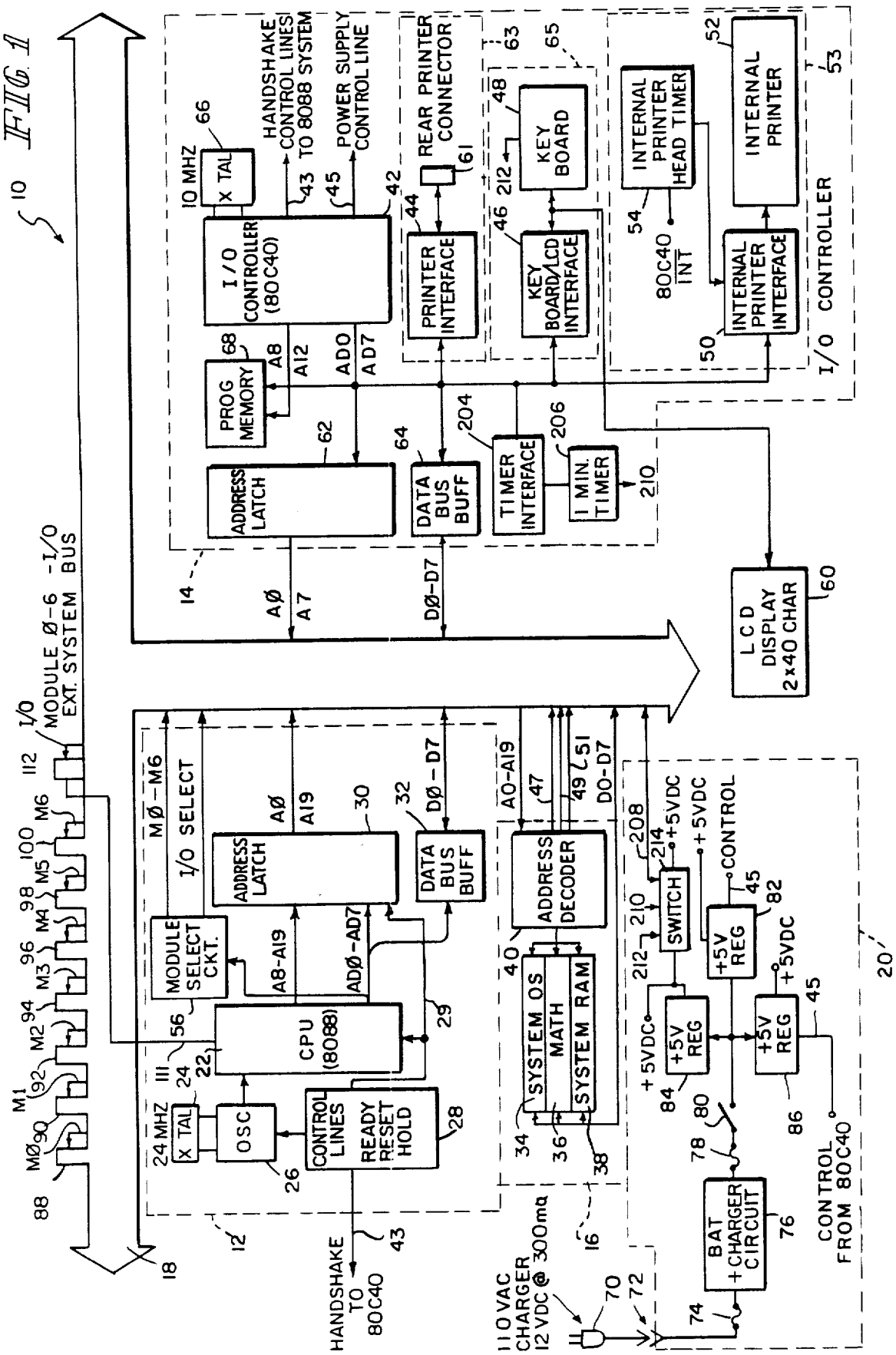
FIG. 1 illustrates a block diagram of a processor board constructed according to the present invention.

Referring to FIG. 1, a computer includes a processor board 10 having a computation section 12, an input-output (I/O) section 14, a shared memory section 16, a system bus 18, and a power supply 20.

Computation section 12 includes computation processor 22 which is illustratively an 8088 microprocessor available from Intel Corporation, 3065 Bowers Avenue, Santa Clara, Calif. 95051. An oscillator 26 is coupled to processor 22. Oscillator 26 is coupled to a 24 MHz crystal which provides the time base for oscillator 26. Illustratively, oscillator 26 divides the 24 MHz signal from crystal 24 by three to provide a 8 MHz signal to processor 22. Handshake logic circuitry 28 is coupled to processor 22, oscillator 26, an address latch 30, and an I/O processor 42 in I/O section 14. Illustratively, handshake logic 28 provides control lines for controlling the "ready", "reset", and "hold", inputs of processor 22 and the "reset" input of oscillator 26.

Processor 22 has eight combination address and data lines, AD0–AD7, and twelve address only lines, A8–A19. Lines AD0–AD7 from processor 22 are coupled to address latches 30 and to a data bus buffer 32 in computation section 12. Address lines A8–A19 are coupled from processor 22 to address latches 30. Address latches 30 couple address lines A0–A19 to system bus 18. Handshake logic 28 is coupled by control lines 29 to address latch 30 for forcing the outputs of address latch 30 to proper states when controller 42 accesses bus 18. This will be discussed in greater detail later. Data lines D0–D7 are coupled from data bus buffer 32 to system bus 18.

Data lines AD0–AD7 are coupled from processor 22 to a module select circuit 56. Module select circuit 56 is coupled by module select lines M0–M6 to system bus 18. Module select circuit 56 is also coupled by an I/O select line to system bus 18. Module select circuit 56 is memory mapped to processor 22. This means that module select circuit 56 is assigned a unique address to which processor 22 writes data when processor 22 wishes to send data to module select circuit 56. Illustratively, this address is D0000 hexadecimal, hereinafter written as $D0000_{16}$.

Memory section 16 includes a memory 34 containing a system operating system, a memory 36 containing math routines, a system RAM 38, and an address decoder 40. RAM 38 is illustratively a shared dual port RAM. Address lines A0–A19 are coupled from system bus 18 to address decorder 40. Address decoder 40 interprets the addresses on lines A0–A19 and causes the appropriate memory 34, 36, or 38 to be addressed. Address decoder 40 is also coupled to the system bus 18 by an operating system module enable line 47, a RAM module enable line 49, and an application program enable line 51. Bi-directional data lines D0–D7 are also coupled from system bus 18 to memories 34, 36, 38.

I/O section 14 includes the I/O controller 42, which illustratively is an 80C40 microcomputer. A 10 MHz crystal 66 is coupled to controller 42 to provide the time base for controller 42. Controller 42 is coupled by eight combination address and data lines, indicated by AD0–AD7, to multiple address latches 62. Controller 42 is also coupled by address and data lines AD0–AD7 and by address only lines A8–A12 to a program memory 68. Address and data lines A0–AD7 are also coupled to an external printer interface 44, a data bus buffer 64, a keyboard and LCD interface 46, an internal printer interface 50, and a timer interface 204. Data bus buffer 64 is coupled by data lines D0–D7 to system bus 18.

Controller 42 is also coupled by handshake control lines 43 to handshake logic 28 of computation section 12, and by power supply control lines 45 to portions of power supply 20, as will be described. External printer interface 44 is coupled to a printer connector 61, to which an external printer can be coupled when desired.

Illustratively, the external printer could comprise a Centronics type printer such as a Brother model HR-5 printer, available from Brother International Corporation, 20 Goodyear, Irvine, CA 92714.

Keyboard and LCD interface 46 is coupled to a keyboard 48, which is illustratively an 8×8 keyboard array with additional special keys, and to a liquid crystal display (LCD) 60. Illustratively, LCD 60 is a 2×40 character display. The special keys include an "on" key, and "off" key, a "program select" key, a "calculation" key, and a "file system" key. Interface 50 is coupled to an internal printer 52. Illustratively, internal printer 52 is a 40/80 column Seiko model STP-411-320 printer, available from Seiko Instruments U.S.A. Inc., 290 T West Lomita Blvd., Torrence, CA 90504. An internal printer head timer 54 is coupled to controller 42 and to printer interface 50 to provide the proper timing pulses to control the printhead in the internal printer.

Timer interface 204 is coupled to a one minute timer 206. One minute timer 206 flags controller 42 every minute so that controller 42 will cause processor 22 to update its calendar and clock. If processor 22 is shut down, controller 42 will cause processor 22 to be powered-up and then cause it to update its calendar and clock. If controller 42 is shut down when the one minute timer 206 times out, one minute timer 206 will cause controller 42 to be powered up.

Power supply 20 includes a charger connector 72 for coupling to a plug-in type battery charger 70. Battery charger 70 is plugged into 110 volts AC and supplies 12 volts DC at 300 milliamps. Alternatively, charger connector 72 can be coupled to a source of 12 VDC such as an automobile cigarette lighter outlet. Power supply 20 also includes a fuse 74, one side of which is coupled to battery charger connector 72 and the other side of which is coupled to battery charger circuit 76. The output of battery charger circuit 76 is coupled through a fuse 78 to one terminal of a switch 80. The other terminal of switch 80 is coupled to three 5-volt regulators 82, 84, 86. Power supply control lines 45 are coupled from controller 42 to regulator 82 and to regulator 86. Illustratively, regulator 82 provides the 5 volt supply for internal printer 52 and 5 volt regulator 86 provides the 5 volt supply for the portions of processor board 12 which can be shut off when not in use. Five volt regulator 84 is coupled to one side of an electronic switch 214 and also provides the 5 volt supply to those portions of processor board 10 which must always remain on. The other side of electronic switch 214 provides power to portions of I/O section 14, particularly controller 42.

Electronic switch 214 has control lines 208, 210, 212 which are coupled to system bus 18, one minute timer 206, and keyboard 48, respectively. System bus 18 propogates control line 208 through to an I/O slot 112. Electronic switch 214 can be turned on, thereby providing 5 VDC of its output, by any of control lines 208, 210, 212.

Illustratively, if a communications module is in I/O slot 112 and receives a message for the computer, the communications module will turn electronic switch 214 on through control line 208. Power will then be provided to controller 42 which will take the appropriate steps to handle the communication.

Keyboard 48 includes "on" and "off" keys which can be used to turn electronic switch 214 on and off through control line 212. One minute timer 206 times out every minute and turns electronic switch 214 on, thereby providing power to controller 42, and also interrupts controller 42 once it is powered up.

Controller 42, after it powers up, queries interface 204 to determine if timer 206 caused controller 42 to be powered up. If this is the case, controller 42 will cause processor 22 to be powered up which will then update its calendar and clock. If timer 206 did not cause controller 42 to power up, controller 42 will assume that the "on" switch on the keyboard was depressed or a module in I/O slot 112 caused the power up. In any event, controller 42 will cause the system to remain on and will power up the remaining parts of the system as needed. This power up scheme is used to conserve power yet maintain the integrity of essential information.

System bus 18 includes user module connector sockets, or slots, 88, 90, 92, 94, 96, 98, 100 and I/O slot 112. User module connector slots 88, 90, 92, 94, 96, 98, 100 will hereinafter be collectively referred to as user module connector slots. Each user module connector slot has an enable terminal which is coupled to a module select line M0-M6. Illustratively, user module connector slot 88 has its enable terminal coupled to module select line M0, user module connector slot 90 has its enable terminal coupled to module select line M1, user module connector slot 92 has its enable terminal coupled to module select line M2, user module connector slot 94 has its enable terminal coupled to module select line M3, user module connector slot 96 has its enable terminal coupled to module select line M4, user module connector slot 98 has its enable terminal coupled to module select line M5, and user module connector slot 100 has its enable terminal coupled to module select line M6. The module enable lines M0-M6 are connected to the same numbered pin of their respective user module connector slot. Therefore, a user module can be placed in any of the seven available user module connector slots as will be described in more detail later. System bus 18 also includes an I/O slot 112 which has an enable terminal I/O coupled to an I/O select line of system bus 18. I/O slot 112 is also coupled by control lines 111 to processor 22. I/O slot 112 may also accept a user module with maximum memory size of 64K bytes.

Figure 2:
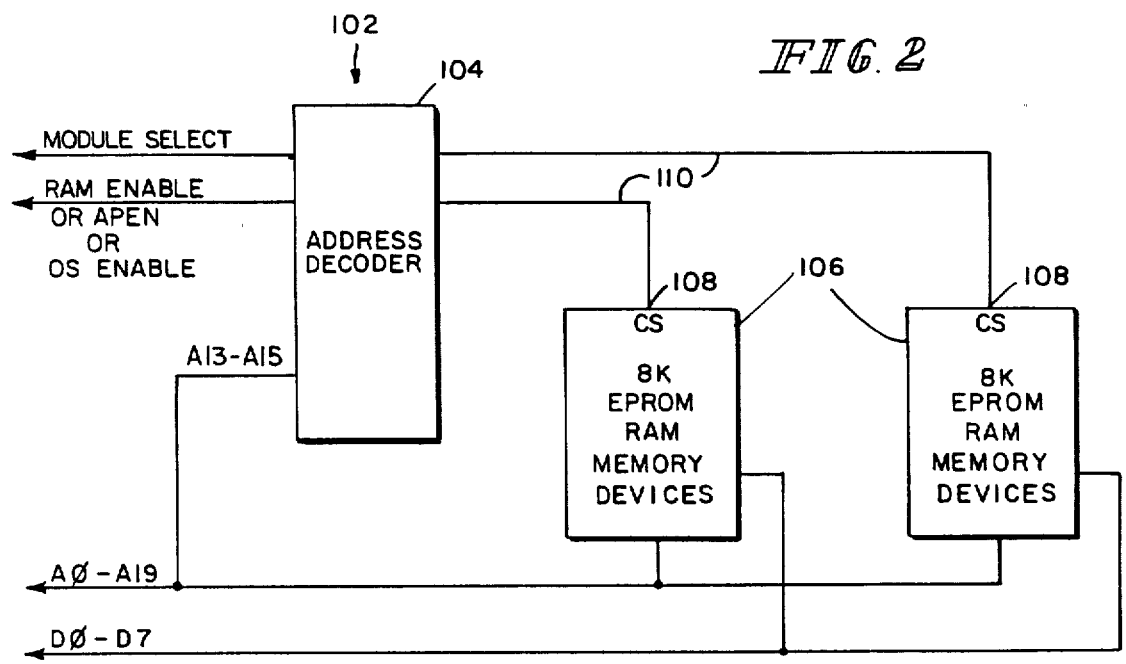
FIG. 2 illustrates a block diagram of a user module constructed according to the present invention.

Referring to FIG. 2, a user module 102 includes an address decoder 104 and two memory devices 106. Illustratively, memory devices 106 can be 8K, 16K, 32K, 64K, or 128K ROMS, EPROMS, or RAMS. Each of the memory devices 106 includes an enable pin 108 which is coupled to an enable line 110 from address decoder 104. Each memory device 106 is coupled to selected address lines A0-A19, described in greater detail later, and data lines D0-D7 of system bus 18 when plugged into any one of the user module connector slots 88, 90, 92, 94, 96, 98, 100. Address decoder 104 is also coupled to the module enable terminal corresponding to the module enable line M0, M1, M2, M3, M4, M5, M6 of the respective user module connector slot 88, 90, 92, 94, 96, 98, 100 into which it is plugged.

User modules can contain application programs, random access memory, or operating system programs. Depending on the module type, the module's address decoder will be coupled to a RAM enable terminal, application program enable terminal, or operating system enable terminal of the particular user module connector slot into which it is plugged. The RAM enable terminals, the application program enable terminals, and the operating system enable terminals for each of the user module connector slots will be in identical locations in each user module connector slot, e.g., the operating system enable line is coupled to pin 1 of each connector slot, the RAM enable line coupled to pin 2, and the application program enable line coupled to pin 3. If memory devices 106 are 8K devices, address decoder 104 is coupled to address lines A13-A15 of system bus 18. If memory devices 106 are 16K devices, address decoder 104 is coupled to address lines A14-A16. If memory devices 106 are 32K devices, address decoder 104 is coupled to address lines A15-A17. If memory devices 106 are 64K devices, address decoder 104 is coupled to address lines A16-A18. If memory devices 106 are 128K devices, address decoder 104 is coupled to address lines A17-A19. Address decoder 104 is illustratively a 3-to-8 decoder.

Figure 3:
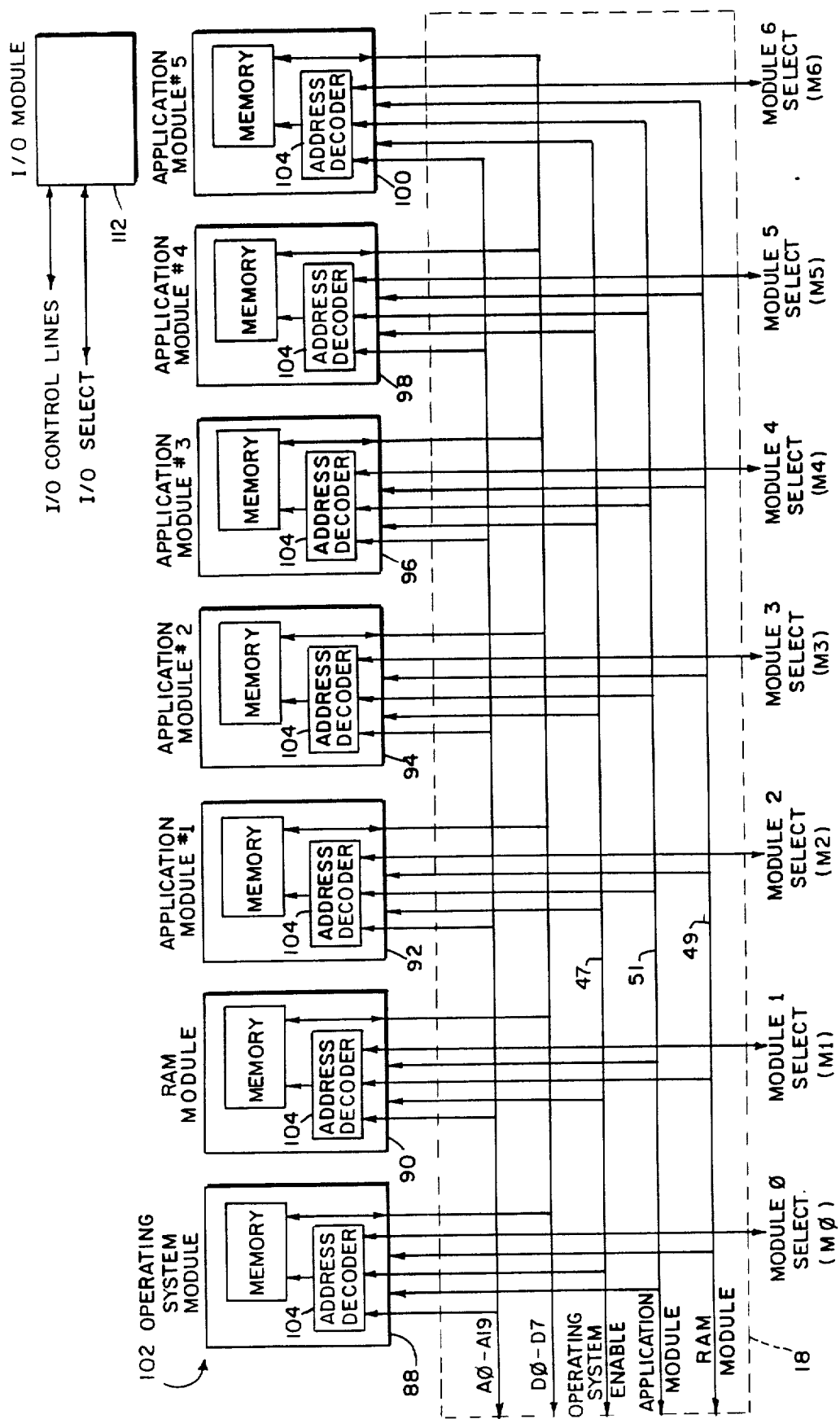
FIG. 3 illustrates a block diagram of a computer system according to the present invention having a plurality of user modules inserted therein.

Referring to FIG. 3, system bus 18 propagates address lines A0-A19, data lines D0-D7, the operating system module enable line 47, the application module enable line 51, and the RAM module enable line 49 to each of user module connector slots 88, 90, 92, 94, 96, 98, 100. System bus 18 also propagates module select lines M0-M6 to respective user module connector slots and the I/O select line to I/O slot 112. Illustratively, an operating system module has been inserted into user module connector slot 88 which is enabled by module select line M0. Since the module in slot 88 is an operating system module, its address decoder 104 is coupled to the operating system module enable line 47 of system bus 18 but is not coupled to the application module enable line 51 or the RAM module enable line 49 from system bus 18.

In the illustrative embodiment, the user module 102 inserted into user module connector slot 90 is a RAM module. Its address decoder 104 is coupled to module select line M1 and, since it is a RAM module, is also coupled to the RAM module enable line 49 from system bus 18. Address decoder 104 of this module is not coupled to the operating system enable line 47 nor to the application module enable line 51.

In the illustrative embodiment, the user module inserted into slot 92 is an application module. Its address decoder 104 is therefore coupled to the application module enable line 51 and is not coupled to the operating system module enable line 47, nor to the RAM module enable line 49. Since this is the third user module connector slot, the address decoder 104 of the application module is coupled to the module select line M2.

In this embodiment, the remaining slots 94, 96, 98, 100 all have application modules in them. Therefore, the address decoders for each of these application modules are coupled to the application module enable line 51 and not to the operating system module enable line 47, nor to the RAM module enable line 49. The address decoder for the module in slot 94 is coupled to module select line M3, the address decoder for the application module in slot 96 is coupled to the module select line M4, the address decoder for the module in slot 98 is coupled to module select line M5, and the address decoder for the module in slot 100 is coupled to the module select line M6.

Module select lines M0 through M6 are coupled to the same numbered pin of their respective user module connector slot. Further, the operating system module enable line 47 is connected to the same pin of each user module connector slot, the application module enable line 51 is connected to the same pin of each user module connector slot, and the RAM module enable line 49 is coupled to the same pin of each user module connector slot. The type of module being used determines to which of the three enable pins in the slot the address decoder of the module is coupled. With this configuration, any user module 102 can be placed in any of the user module connector slots.

Referring to FIGS. 1–3, the operation of the computer is described. A reset line from controller 42 is coupled to handshake logic 28 which enables controller 42 to reset processor 22. A ready line from handshake logic 28 is coupled to controller 42 which permits controller 42 to control which of controller 42 and processor 22 is permitted to access system bus 18 at any particular time. Illustratively, each time controller 42 wishes to access system bus 18, it pulls the hold line coupled to handshake logic 28 which in turn causes processor 22 to enter a hold state.

Processor 22 is illustratively an Intel 8088. An 8088 is a 16 bit microprocessor having an 8 bit external Address/Data bus. Address latch 30 couples processor 22 to dual-port memory section 16 over system bus 18. The 8088 processor is characterized in that the first 8 bits of the Address/Data bus, AD0–AD7, pass both address information and data information each time there is a memory cycle or an I/O cycle. The first 8 bits out on AD0–AD7 are address information. An ALE line from the 8088 indicates when that address information is present. The ALE line is coupled to address latch 30 to latch the address information presented on AD0–AD7 of processor 22 into address latch 30. Approximately 400 nanoseconds later, AD0–AD7 becomes a data bus and the next 8 bits of information presented on AD0–AD7 will be data. AD0–AD7 is a bidirectional bus. A8–A15 are static lines from processor 22 and are therefore only buffered and not latched by address latch 30. The upper 4 bits from processor 22, A16–A19, are also latched by ALE. In this particular application, other functions that these four bits can have at different times in the cycle are not utilized, so that the only use made of A16–A19 is for address information.

When controller 42 accesses system bus 18, address latch 30 must effectively disconnect itself from system bus 18. Handshake logic 28, in response to a signal on line 43, causes certain outputs of address latch 30 to assume predetermined states when controller 42 accesses bus 18. The only purpose controller 42 has in accessing bus 18 is to communicate with the two-way buffer portion of system RAM 38. Illustratively, this buffer comprises the upper 128 bytes of an 8K RAM. As will be described later, system RAM 38 is allocated an address block starting at $0_{16}$. Consequently, the 128 byte buffer will have addresses $1F80_{16}$ through $1FFF_{16}$. To simplify addressing of this buffer by controller 42, the outputs of address latch 30 for address lines A8–12 and A16–A19 are forced high and the outputs for lines A13–A15 are forced low by handshake logic 28. Since the address lines of the embodiment shown are illustratively negative "true," a base address of 1FXX is statically preset. The outputs of address latch 30 for address lines A0–A7 are tri-stated and controller 42 utilizes address lines A0–A7 to address the 128 byte buffer of system RAM 38. The hold acknowledge line from processor 22 is tied to data bus buffer 32 to tri-state it when controller 42 is accessing system bus 18 through either address latch 62 or data bus buffer 64.

Data bus buffer 32 is a bi-directional buffer. It buffers the data flowing between processor 22 and system bus 18. It is coupled to the ALE line of processor 22 so that only the second 8 bits presented on AD0–AD7 will flow through data bus buffer 32 onto system bus 18.

Memory section 16 includes the onboard memory for processor board 10. Illustratively, memory section 16 comprises a memory containing a system operating system 34 for interacting with the specific hardware used by the hand held computer. Typically, the functions implemented in the system operating system are those which will not change unless a particular hardware element of the hand held computer is changed or modified. As will be discussed later, an additional operating system module can be plugged into one of the module connector slots on system bus 18 to handle the software dependent functions of the particular application program which is currently being run. The application program being run is selected from among the application programs contained in the modules which are plugged into the user module connector slots.

Memory section 16 also includes a memory which contains programs for the math routines used by the computer. Illustratively, this can be a collection of library functions and math routines such as multiplication, division, a floating point package and other functions.

Memory section 16 also has a random access memory (RAM) portion which is illustratively two 8K by 8 static CMOS dual-port RAM. As discussed, the upper 128 bytes of this RAM are used as a buffer area to handle communications between processor 22 and controller 42. The lowest 1K is dedicated for interrupt handling by the architecture of the 8088 illustratively used as processor 22.

Since the computer will often be used in situations where it will not be plugged into a source of 110 volt AC power, it is necessary that those devices within the computer which must remain on continuously draw as little power as possible to extend the time that the computer can be used without the battery needing recharging. Therefore, the power-up and power-down schemes used cause any unnecessary portion of the system to shut down when not needed.

The 80C40 is a microcomputer which includes a central processing unit (CPU), an 8 bit internal timer and 64 bytes of internal RAM. Controller 42 is coupled to 10 MHz crystal 86. In addition to providing the time base for the CPU of the 80C40, crystal 66 can also provide the input to an 8 bit internal timer of the 80C40. Illustratively, the 10 MHz signal from crystal 66 is divided down to provide the input to the 8 bit internal timer. Illustratively, the input of this timer will be approximately 80 microseconds per stroke. This signal provides a time base for running I/O section 14.

The lowest 8 bytes of the internal data RAM of controller 42 are registers which the 80C40 uses for manipulating data. The two lowest bytes, which are referred to as R0 and R1 in the 80C40 literature, are used as pointers for data moves by the 80C40 both internally within the RAM area and externally to I/O ports. The 80C40 has four 8-bit I/O ports. One port is utilized as the Address/Data (A/D) bus and is shown in FIG. 1 as the source of address and data lines AD0–AD7.

The four ports of the 80C40 can be used in several modes of operation. If the 80C40 were being used as a stand alone processor, the four ports would be programmable I/O ports. In the present invention, port 1 is utilized as a programmable I/O port. Port 0 is used as the address and data bus. Port 2 is the present invention is a hybrid. Some of the lines are used for addressing and some of the remaining lines are used for control of certain elements in the I/O section 14 such as providing power supply control lines 45.

Address latch 62 and data bus buffer 64 function is essentially the same way as address latch 30 and data bus buffer 32 function for processor 22. The first 8 bits put out on port 0, AD0-AD7, comprise address data. This is latched into address latch 62 by the ALE line from the 80C40. The ALE line then undergoes a transition and the next 8 bits out are data, which is transmitted to system bus 18 through data bus buffer 64. The hold acknowledge line from processor 22 in combination with a hold request line for controller 42 are used to tri-state the address latch 62 and data bus buffer 64 when processor 22 has been given control of system bus 18, thereby disconnecting address latch 62 and data bus buffer 64 from system bus 18.

Memory 68, which is illustratively a 2764, is a 64K (8K×8) NMO's EPROM. Memory 68 contains the program used by controller 42. In addition, much of memory 68 is used to generate the character set for printer 52. Printer 52 is illustratively a Seiko printer, the printer mechanism of which has two separate motors, one of which moves the printhead horizontally and the other of which moves the paper up and down through the printer. The Seiko printer is a thermal printer and, as the printhead moves across the paper, the 8 or 9 thermal dots of the printhead are hit with approximately a one and one-half milisecond pulse each time the horizontal motor is stepped one step in order to create the character. The data which is utilized to form the characters is stored in memory 68.

Illustratively, processor 22 passes an ASCII character to controller 42 through the buffer in memory section 16. Controller 42 utilizes the data in memory 68 to generate the proper signals to send to printer 52 in order to generate the printed character on the paper.

Interface 44 permits coupling of controller 42 to an external printer through printer connector 61. The data which is sent through interface 44 to the external printer is obtained from the internal data RAM of controller 42. The data originates from processor 22 which, having finished some operation, will transfer the result into the 128 byte buffer of system RAM 38 of memory section 16. Controller 42 then accesses system RAM 38 and reads the information stored in the 128 byte buffer. Controller 42 then transfers this information out to the external printer through interface 44 and printer connector 61. Illustratively, controller 42 reads a line of characters stored in the 128 byte buffer. After controller 42 has transferred most of the characters it read from the buffer out through interface 44 to the external printer, it reads additional data from system RAM 38. This process continues until all the data sent from processor 22 has been printed by the external printer.

Processor 22 sends data to LCD 60 through system RAM 38 of memory section 16 and the 80C40. LCD 60 is illustratively an intelligent peripheral device. In the embodiment shown, it can buffer and refresh 80 alphanumeric characters, which comprises two rows of 40 characters.

Module select circuit 56 is illustratively an 8 bit octal register. Each line M0-M6 is one output from register 56. Each line M0-M6 is coupled to a respective one of the 7 module connector slots 88, 90, 92, 94, 96, 98, 100 of the system bus 18. An I/O select line is also coupled from module select register 56 to I/O slot 112 of system bus 18.

Power supply 20 includes a battery which is illustratively part of battery charger circuit 76. Illustratively, the battery is a 2.2 amp-hour NICAD battery. The voltage from this battery can illustratively range from 5-½ to about 7-½ volts depending upon the charge level of the battery.

External charger 70 plugs into a wall outlet and illustratively provides 12 volts DC at 300 milliamps through connector 72 and fuse 74 to battery charger circuit 76. Connector 72 can also be coupled directly to a source of 12 VDC such as an automobile cigarette lighter socket. Battery charger circuit 76 includes a constant current regulator for recharging the battery at approximately 200 milliamps. A fully discharged battery requires approximately 10 hours at this rate to become fully charged.

Battery charger circuit 76, including its battery, is coupled through fuse 78 to switch 80. Switch 80 is enabled by the user when he first receives the computer. Once switch 80 is enabled, the system is active and system RAM 38 can be loaded with data. Switch 80 is located in a somewhat inaccessible place, for if switch 80 is turned off, everything contained in system RAM 38 would be lost. System RAM 38 is illustratively used for long term data storage so that it can be used on a regular basis.

The other terminal of switch 80 is coupled to three 5 volt regulators, regulators 82, 84, 86. Regulator 82 is illustratively dedicated to providing the power for Seiko printer 52. Seiko printer 52 illustratively requires 3-½ amps when the thermal printhead is on. Additionally, the printer motors of printer 52 will consume an additional ½ amp. The load drawn by printer 52 is very irregular, as the printhead is only turned on for approximately 1-½ milliseconds at a time and the motors are typically turned on and off every 4 milliseconds. Consequently, it is necessary to isolate the power supply for the logic on the processor board 10 from printer 52. This is achieved by providing separate regulators 84, 86 to control the logic while using regulator 82 for printer 52. Printer regulator 82 is controlled by controller 42 over a control line 45. Controller 42 disables regulator 82 to prevent current from being drawn from the battery when printer 52 is idle.

Regulator 86 provides power to some portions of processor board 10 which can be switched off when the system is idle. Regulator 86 is also controlled by controller 42 over a control line 45. Regulator 84 provides power to the logic portions of processor board 10 which must remain on at all times. Illustratively, timer 206, interface 204 and system RAM 38. As discussed, the output of regulator 84 is switched by electronic switch 214 to controller 42 and other portions of I/O section 14 so that only the essential portions of processor board 10 remain powered up when the system has been shut down.

The logic portion of processor board 10 which is switched off when the computer is idle is illustratively found in computation section 12. Illustratively, processor 22, handshake logic 28, oscillator 26, crystal 24, address latch 30, data bus buffer 32, and LCD 60 can be turned off when the system is idle. Further, system operating system 34 and math section 36 are contained in chips which draw a fairly substantial amount of current when on and are therefore provided with power from regulator 86 such that they are switched off when the system is idle. Also, after a predetermined period of time with no activity, controller 42 will cause electronic switch 214 to shut off, thereby depowering all but the minimum essential portions of processor board 10. As CMOS technology develops and the prices of CMOS chips fall, the chips which must be switched off to conserve power can be replaced with CMOS chips and the entire processor board 10 with the exception of printer 52 may be able to remain on at all times.

Referring to FIG. 2, the operation of a user module 102 is described. User module 102 includes memory devices 106 which can illustratively be RAMs or EPROMs. Illustratively memory devices 106 are 28 pin devices using the industry standard for 28 pin memory devices. Therefore, a variety of ROM, EPROMs or RAMs can be utilized as memory devices 106. Illustratively, memory devices 106 could comprise an 8K × 8 static CMOS RAM in both locations or could comprise 8K, 16K, 32K, 64K or 128K EPROMs, ROMs, or RAMs.

User module 102 also includes address decoder 104 which is coupled to both memory devices 106. Address decoder 104 is illustratively a 74C138 available from Texas Instruments, Inc., P.O. Box 5012, Dallas, Tex. 75222. Address lines A13–A15 from system bus 18 are connected to address decoder 104 when the module 102 is received in a user module connector slot of system bus 18 and memory devices 106 are 8K devices as discussed previously. The remaining address lines A0–A12 are connected to the memory devices 106. When memory devices 106 are 16K devices, address lines A14–A16 are connected to address decoder 104 and address lines A0–A13 are connected to memory devices 106. When memory devices 106 are 32K devices, address lines A15–A17 are connected to address decoder 104 and address lines A0–A14 are connected to memory devices 106. When memory devices 106 are 64K devices, address lines A16–A18 are connected to address decoder 104 and address lines A0–A15 are connected to memory devices 106. When memory devices 106 are 128K devices, address lines A17–A19 are connected to address decoder 104 and address lines A0–A16 are connected to memory devices 106. Data lines D0–D7 from system bus 18 are also connected to memory devices 106.

Address decoder 104 is a 3-to-8 decoder. As presently contemplated, an application program or operating system program can be contained in a program set of up to four user modules and up to four RAM modules can be active at a given time. Therefore, select lines 110, which are coupled from the outputs of address decoder 104 to the enable pins of memory devices 106, would illustratively be connected to output 0 and output 1 of address decoder 104 for the first module in the program set, select lines 110 would be connected to outputs 2 and 3 of address decoder 104 if the module were the second module in a program set, select lines 110 would be coupled to outputs 4 and 5 of address decoder 104 if the module were the third module in a program set, and select lines 110 would be coupled to outputs 6 and 7 of address decoder 104 if the module were the last module in a program set.

As discussed previously, each user module connector slot has a RAM enable pin coupled to the RAM enable line 49 of system bus 18, an application program enable pin coupled to the application program enable line 51 of system bus 18, and an operating system enable pin coupled to the operating system enable line 47 of system bus 18. Each user module connector slot is also coupled to a unique one of the module select lines M0–M6. The particular type of user module determines whether the module itself is connected to the RAM enable pin, the application program enable pin or the operating system enable pin of a user module connector slot when it is received in the user module connector slot.

Processor 22 can address one megabyte of memory. The megabyte is divided into four sections of 256K each. Each section is allocated to a particular function. Illustratively, RAM is allocated the 0–256K block, the application program dependent operating system is allocated the 256K–512K block, the application program section is allocated the 512K–768K block, and the system operating system is allocated the 992–1024K block. As presently contemplated, the 768–992K block is left open for expansion if needed.

Referring to FIG. 3, the operation of the computer having illustrative user modules received in the user module connector slots of system bus 18 is described. As mentioned, these user modules are memory modules which implement a variety of different functions. In the embodiment shown, a module containing an operating system function (an operating system module) would be received in the user module connector slot 0, that is, slot 88. A module for a RAM function (RAM module) is received in slot 90, user module connector slot 1, and modules containing application program functions (application program modules 1 through 5) are received in user module connector slots 2–6, slots 92, 94, 96, 98, 100. In the embodiment shown, each application program module contains an individual application program or part of a program set. In order to select a particular application program, an operator causes processor 22 to enable module select lines M0–M6 selectively through module select register 56 by pressing a "program select" key on the keyboard. Module select lines M0–M6 will be sequentially enabled and disabled so that each user module connector slot will be enabled by its respective module select line M0–M6. Each time a user module containing the first part of an application program is enabled, the sequential enabling and disabling of user modules will stop. If the operator does not want to use the selected application program, he presses the "program select" key again which restarts the selection process. Once the operator has selected the desired application program, he will then run the program.

If the operator wishes to change application programs, he merely presses the program select key on the keyboard which will cause the next module select line M0–M6 to be enabled and the current module select line M0–M6 to be disabled. This will enable the module in the next slot. As each application program has been allocated the same 256K address block and each application program begins at the same address, switching application programs can be done almost instantaneously since the application module contains the memory which is utilized by processor 22 to obtain the code which it executes. The application program contained in the application module is not read from the application module into another memory which is accessed by processor 22 to obtain the program code for execution. Rather, processor 22 accesses the user module containing the application program to fetch each instruction to be executed. The enabled user module becomes the program memory for processor 22. Switching between operating system programs contained in operating system user modules could be accomplished in the same manner. However, in the embodiment of the invention described herein, the computer only switches between memory modules containing application programs to switch programs. The system considers it an error if modules containing more than one operating system program are received in the connector slots at any one time. Each type of function has the same addresses allocated to it and begins at the same address. This permits quick switching between modules for the same function.

Figure 4:
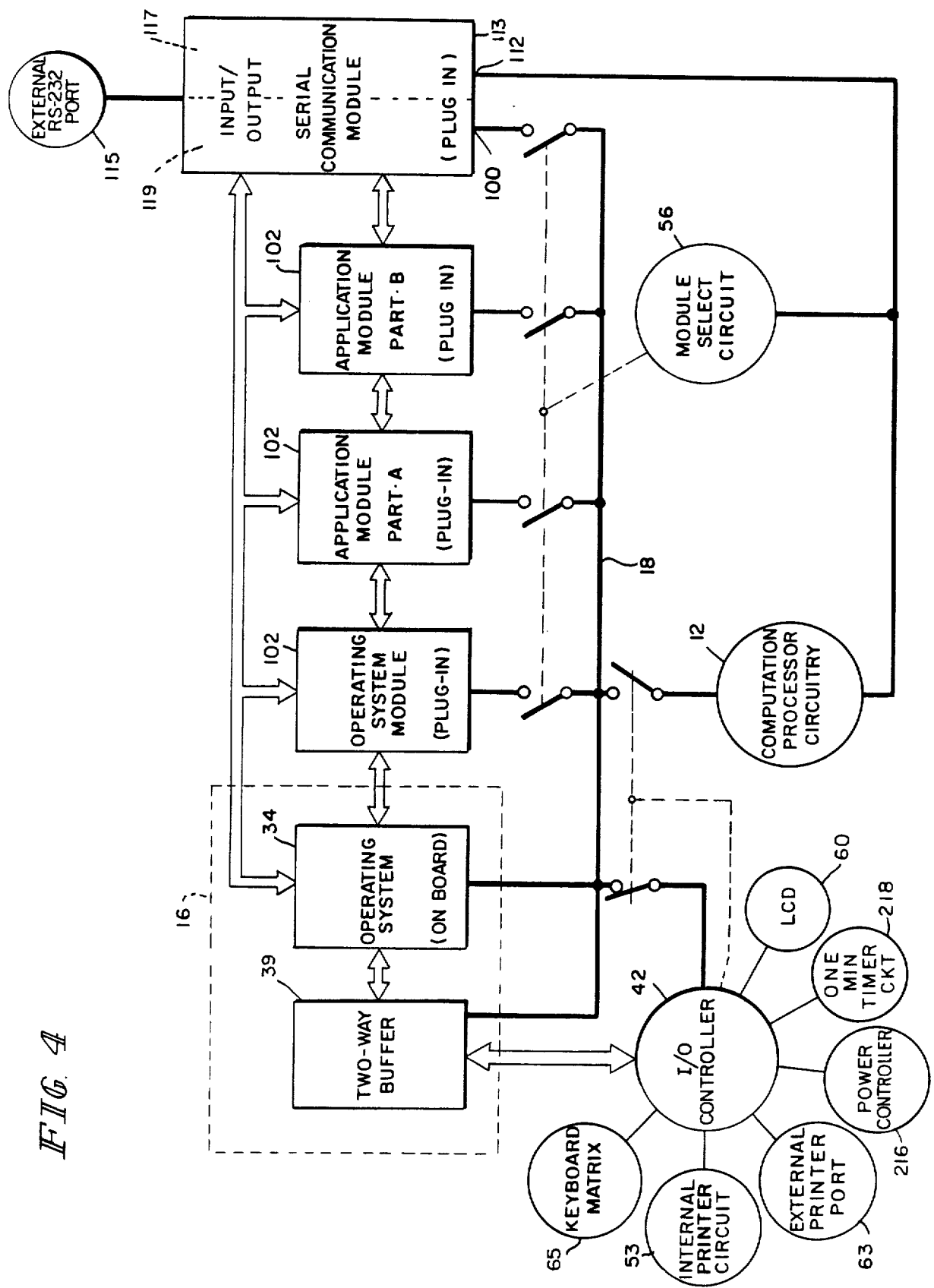
FIG. 4 is a diagrammatic illustration of hardware and software interconnections between various portions of a system constructed according to the present invention.

FIG. 4 is a diagrammatic illustration of the computer showing hardware and software inter-connections between the various hardware modules and software packages. A hollow line indicates a software connection, a solid line a hardware connection, a box a software package contained in a module or memory, and a circle a hardware device. I/O controller 42 is coupled to keyboard matrix circuit 65, LCD 60, internal printer circuit 53, external printer port 63, a power controller circuit 216, and one minute timer circuit 218. The printer connection of LCD 60 with controller 42 through keyboard interface 46 was described previously. Power controller circuit 216 illustratively comprises electronic switch 214 and its associated control lines 208, 210, 212. One minute timer circuit 218 illustratively comprises one minute timer 206 and timer interface 204. I/O controller 42 only accesses system bus 18 in order to communicate with two-way buffer 39 of system RAM 38, illustratively, dual-port RAM, which is also coupled to system bus 18.

Buffer 39 is shown connected to system operating system 34 through a software connection and hardware connected to system bus 18. As described with reference to FIG. 1, system RAM 38 and operating system 34 are part of memory section 16. System operating system 34 contains the on-board or system operating system program for computation processor section 12 which is utilized by processor 22 (FIG. 1) whenever an operating system program or application programs from user modules 102 are not being executed. System operating system 34 and the user modules 102, which are illustrated as a plug-in operating system module, an application module part-A, and an application module part-B, are also interconnected with software connections. I/O module 113 comprises a control part 117 and a data transfer part 119. The control part 117 is shown plugged into I/O slot 112 and the data transfer part 119 is shown plugged into user module connector slot 100. I/O module 113 is illustratively a serial communication module and has an external RS-232 port, 115. LCD display 60 is coupled to system bus 18 as is computation processor circuitry 12. Computation processor circuitry 12 is also hardware connected to module select circuit 56 and to I/O slot 113.

In operation, system operating system 34 provides the system level operating system for computation processor 22 of processor circuitry 12. Processor circuitry 12 also controls I/O module 113 and communicates with data transfer part 119 of I/O module 113 over system bus 18. Computation processor circuitry 12 also communicates with I/O controller 42 through buffer 39.

I/O controller 42 handles the specific I/O functions for the computer and controls keyboard matrix 65, internal printer circuit 53, and external printer port 49. I/O controller 42 also controls LCD 60 through keyboard interface 46 and sends the data necessary to generate characters on LCD 60 to LCD 60.

Computation processor circuitry 12, under control of system operating system 34, selects the operating system user module(s) 102, and transfers program control to the selected operating system module(s) which then cause processor circuitry 12 to select the various user module(s) 102 needed to run a desired application program. As shown in FIG. 4, for purposes of this discussion, an operating system module, a "part-A" application module, and a "part-B" application module are plugged into the user module connector slots in system bus 18. Computation processor circuitry 12 commands module select circuit 56 to generate a "true" condition on the enable lines for the appropriate user module connector slots (FIG. 1), which effectively couples the user modules 102 to system bus 18. Program control of computation processor circuitry 12 is then tranferred to the operating system program and application program contained in the operating system module(s) and the application program module(s). In the illustrative embodiment shown in FIG. 4, the application program being run is stored in two user modules 102. The "part-A" application module contains the first part of the application program and the "part-B" application module contains the last part of the application program. Also needed to run the application program is an operating system which is tailored for the particular family of application programs being run. This is the operating system module contained in a user module 102.

Figure 5:
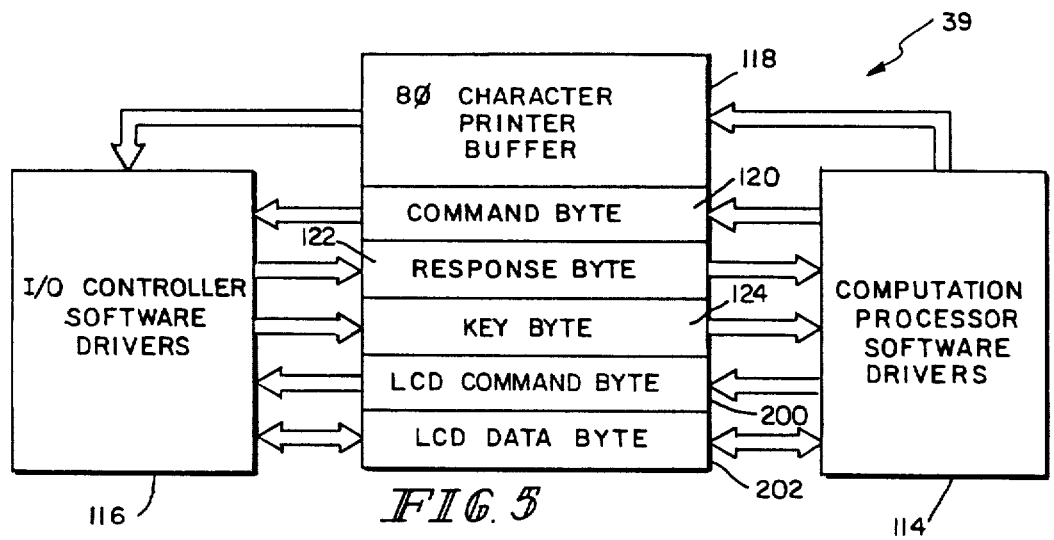
FIG. 5 illustrates a block diagram of a two-way buffer constructed according to the present invention.

Referring to FIG. 5, buffer 39 of system RAM 38 is illustrated in greater detail. System operating system 34 (FIG. 1) contains software drivers 114 for computation processor 22 (FIG. 1) which are software connected with buffer 39. Buffer 39 is, in turn, software connected with software drivers 116 for I/O controller 42 (FIG. 1). Illustratively, buffer 39 comprises 128 bytes of system RAM 38 (FIG. 1). Of these 128 bytes, 80 bytes are allocated to form an 80 character printer buffer 118. Buffer 38 also includes command byte 120, response byte 122, key byte 124, LCD command byte 200, and LCD data byte 202.

When processor 22 (FIG. 1) generates characters to be printed by either the internal or external printer (FIG. 1), software drivers 114 transfer the characters to be printed into the 80 character printer buffer 118. It should be understood that software drivers 114 do not actually perform any operations, but rather cause processor 22 to do so. The same is true with driver 116 and controller 42. Once all 80 characters are filled in printer buffer 118, drivers 114 will wait until characters have been read from buffer 118 by drivers 116 before transferring any additional characters into buffer 118. Drivers 116 cause I/O controller 42 (FIG. 1) to read characters from printer buffer 118 and then transfer them out to the selected internal or external printer (FIG. 1). As the characters are being read from buffer 118, buffer 118 is also being emptied so that drivers 114 can cause processor 22 (FIG. 1) to transfer any additional characters it may have into buffer 118.

Command byte 120 is, illustratively, an 8-bit byte which is written by processor 22 (FIG. 1) under control of software drivers 114 to pass commands to controller 42. I/O controller 42, under control of drivers 116, reads the command byte and performs the requested function. The following table is illustrative of the commands which can be passed in the command byte by setting the appropriate bit.

| COMMAND | BIT # |
|---|---|
| BEEPER LONG ON | 0 |
| TIME IN SECONDS | 1 |

-continued

| COMMAND | BIT # |
| --- | --- |
| BEEPER ON | 2 |
| EXTERNAL PRINTER ON | 3 |
| 80 COLUMN INTERNAL PRINTER ON | 4 |
| 40 COLUMN INTERNAL PRINTER ON | 5 |
| POWER OFF REQUEST | 6 |
| LCD DISPLAY ON | 7 |

It should be understood that internal printer 52 can be selectively set up for 40 column or 80 column operation, as described previously. Setting the appropriate bit in the command byte determines whether 40 column or 80 column operation is selected.

Response byte 122 is an 8-bit byte and is written by drivers 116 and is read by drivers 114. It is used by controller 42 to pass information relative to the status of certain I/O operations to processor 22. The following table illustrates typical responses which are passed in the response byte by setting the appropriate bit.

| RESPONSE | BIT # |
| --- | --- |
| INTERRUPT BUSY SET | 0 |
| TIME IN SECONDS SET | 1 |
| TIME IN MINUTES SET | 2 |
| BATTERY LOW | 3 |
| BATTERY DEAD | 4 |
| PRINTER DONE | 5 |
| KEY FOUND | 6 |
| LCD DISPLAY DONE | 7 |

Processor 22 keeps, typically in system RAM 38, data related to the time and date, i.e., a clock and calendar. Since processor 22 is periodically turned off, it is necessary that processor 22 be powered-up periodically so that it can update the time and date data. If it is desired to update the information every second, processor 22 will cause the "TIME IN SECONDS SET" bit of command byte 120 to be set. Controller 42 reads command byte 120 and responds to the "TIME IN SECONDS" bit being true by setting the "TIME IN SECONDS SET" bit of response byte 122 every second. Processor 22 will read the "TIME IN SECONDS SET" bit of response byte 122 and update the time and date information every time the "TIME IN SECONDS SET" bit is set.

This process continues even when processor 22 has been turned off. I/O controller 42 will cause processor 22 to "wake-up" every minute as timer 206 times out and flags controller 42. If controller 42 is shutdown, timer 206 will cause it to be powered up when timer 206 times out. Processor 22 will update the time and date information accordingly and then request that it be turned off again. I/O controller 42 will then turn off processor 22 until the next time controller 42 sets one of the "TIME" bits in response byte 122.

Key byte 124 is written by drivers 116 and read by drivers 114. Key byte 124 is used to transfer data indicative of the particular key of keyboard 48 which has been detected by I/O controller 42.

LCD command byte 200 is used by processor 22 to pass commands to controller 42 which are used by controller 42 in controlling LCD 60, such as causing LCD 60 to be cleared and the like. LCD data byte 202 is used to pass data to LCD 60 from processor 22 through controller 42 to cause a character to be displayed by LCD 60. LCD data byte 202 is also used by processor 22 to read a character from LCD 60 through controller 42.

Figure 6:
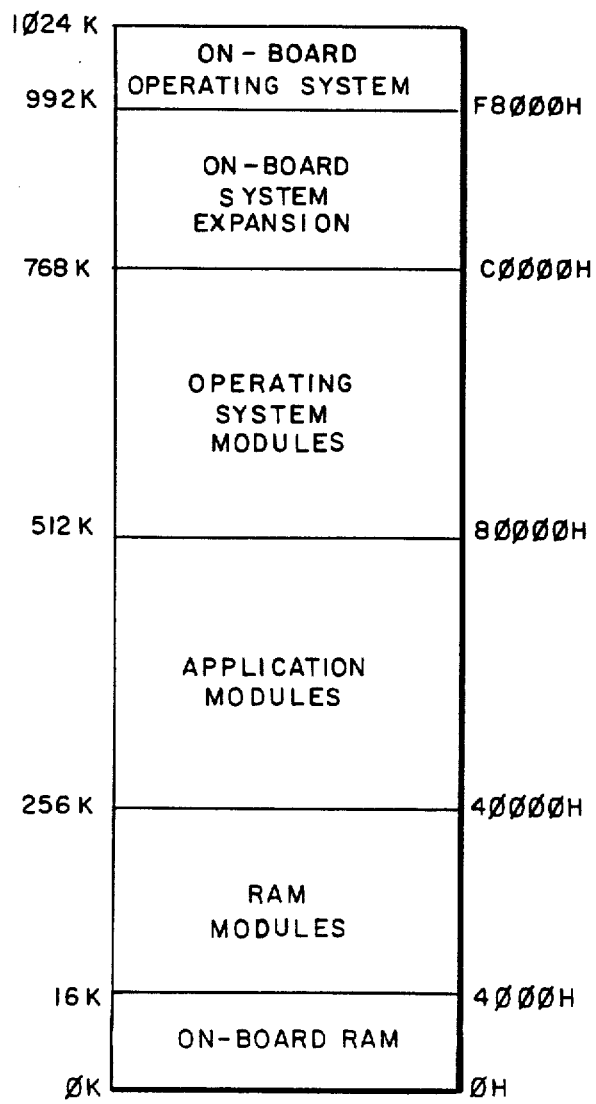
FIG. 6 illustrates a memory map for a computation processor constructed according to the present invention.

Referring to FIG. 6, an illustrative memory map for processor 22 is shown. An Intel 8088 microprocessor illustratively is used for processor 22. This device can address one megabyte (1024K) of memory. In FIG. 6, the kilobyte boundaries between adjacent memory segments are shown on the left side of the map while the hexadecimal addresses corresponding to these boundaries are shown on the right. Illustratively, system RAM 38 is allocated the first 16K of memory. As presently configured, the computer has 16K of on-board RAM. Therefore, system RAM 38 comprises on-board RAM allocated the first 16K of memory. As discussed, the upper 128 bytes of the 8K on-board RAM comprise buffer 39.

The memory segment from 16K through 256K is allocated to RAM user modules 102. Referring to FIG. 2, if more than one RAM-type user module 102 is to be used at any given time, the select lines 110 for the first RAM module would be the first two outputs from address decoder 104 and the enable lines 110 for the second RAM-type user module would be the third and fourth outputs from the address decoder 104. The fifth and sixth outputs of address decoder 104 would be used for enable lines 110 of a third RAM-type user module 102 and the seventh and eighth outputs of address decoder 104 would be used for enable lines 110 of a fourth RAM-type user module 102. Since this scheme is also utilized for operating system-type user modules 102 and application program-type user modules 102, up to four user modules 102 from any of these three function types can be used at any one time.

The memory segment from 256K through 512K is allocated to application program-type user modules 102. As discussed, each application program has the same starting address. This is illustratively 256K or $40000_{16}$. The application program user module 102 which contains the first part of the application program is designated the "part-A" application module, the next the "part-B" application module, and so on if additional modules are needed to contain an application program. As discussed previously, a plurality of application modules can be inserted in the system bus 18 at any one time. The module select lines M0–M6 for the respective user module connector slots enable the module which is inserted into the slot effectively coupling the module to system bus 18. Since only one part-A application module will be enabled at any one time, a plurality of part-A application modules can be inserted into the user module connector slots at any given time. To switch from one application program to another where modules for more than one application program are inserted into the bus, the operator merely presses the program select key, and the module enable lines are sequentially enabled and disabled until the part-A application module containing the desired application program is enabled. That application program is then allocated the 256K–512K memory segment which is addressed by processor 22 to execute the application program. Switching between application program modules 102 can also be accomplished under control of an operating system program, typically the operating system program contained in an operating system user module 102.

The 512–768K memory segment is allocated to the plug-in operating system user modules 102. These modules are selected in a manner similar to the way the application program user modules 102 are selected but in the embodiment of the invention described herein, only a user module or modules containing one operating system can be received in the connector slots at any one time.

The 768K–992K memory segment is, as presently contemplated, not utilized and is allocated for any possible memory expansion which may be needed for onboard memory section 16. The memory segment from 992K through 1024K is allocated to system operating system 34, and contains, as discussed previously, the software drivers 114 (FIG. 5) for computation processor 22.

Figure 7A:
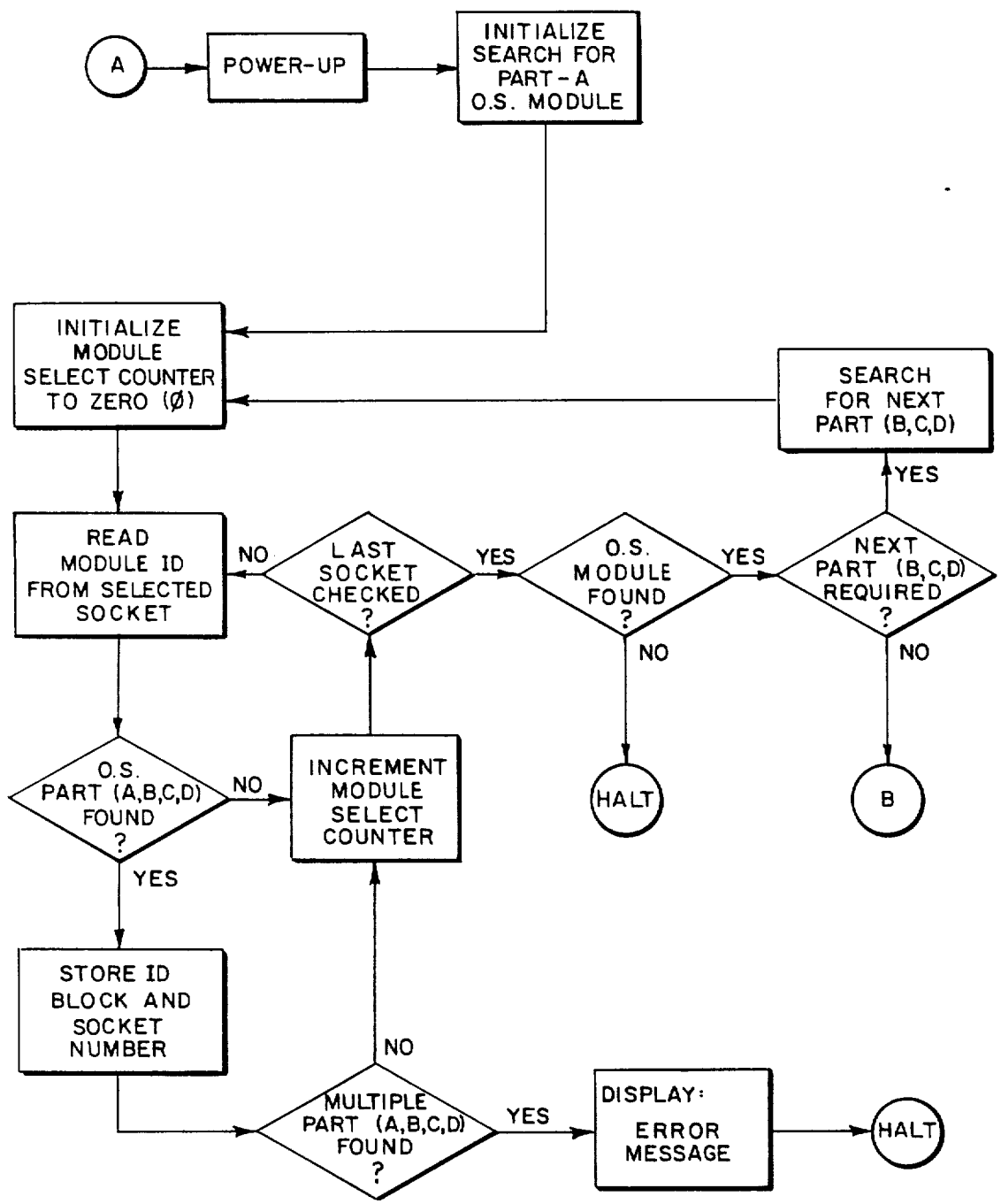
FIGS. 7a–7c illustrate flow-charts of a program according to the present invention.
Figure 7B:
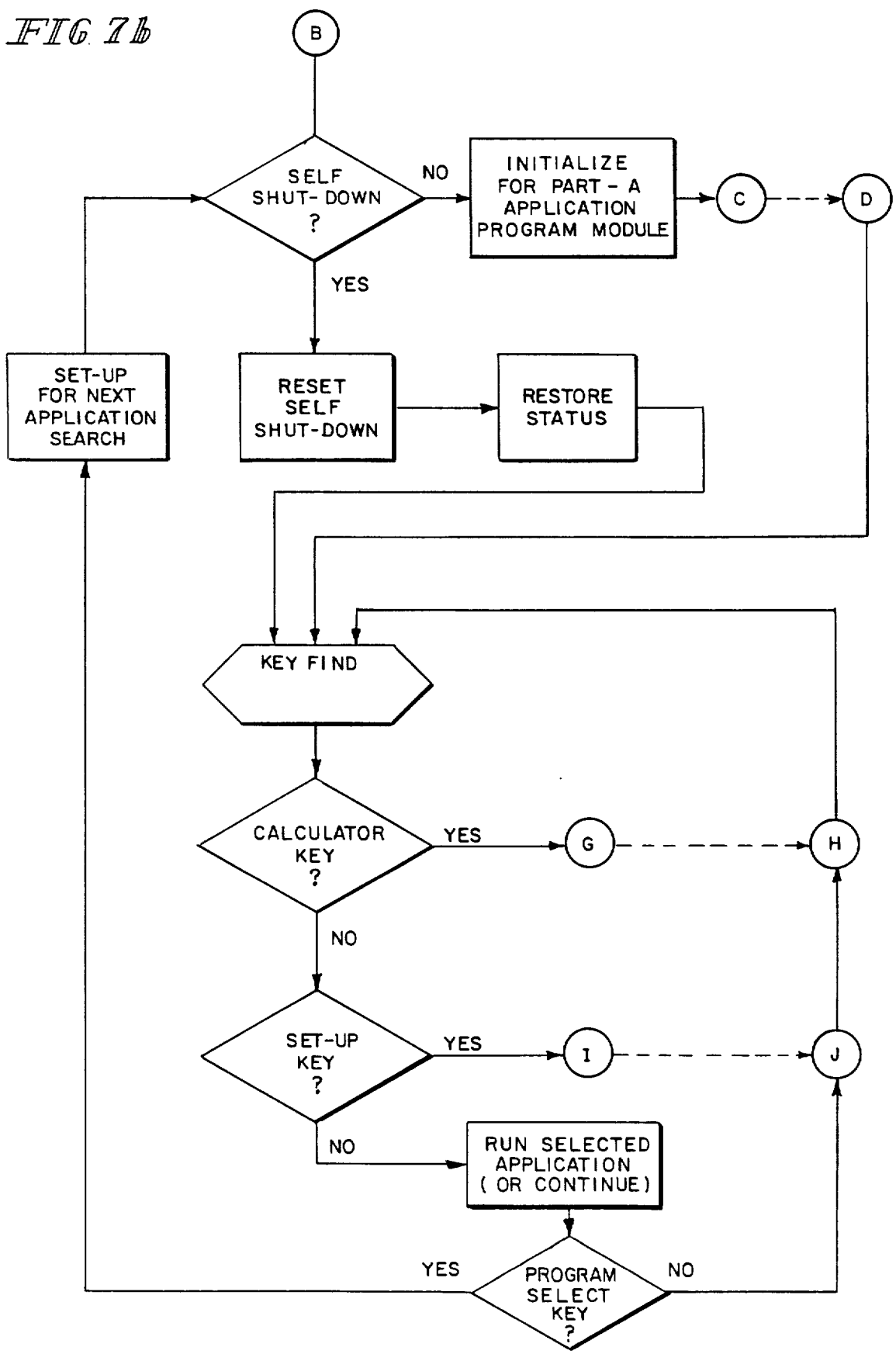

Referring to FIGS. 7a–b, a flow chart illustrative of the program sequence for the computer is shown. Initially, computation section 12 is off and controller 42 is off. When the "on" key on keyboard 48 is depressed, electronic switch 214 switches power to controller 42. Once the controller 42 has powered-up and detects that the "on" key on keyboard 48 has been depressed, it causes processor 22 to power-up. Once processor 22 detects a power-up interrupt, it begins executing the program in the flow chart of FIG. 7-a which is stored in system operating system 34.

Operating system 34 first causes processor 22 to search for the presence of a "part-A" operating system user module 102 plugged into a user module connector slot. As with the application program user modules described previously, a "part-A" operating system user module refers to an operating system-type user module which contains the first part of an operating system. It should be understood that just as an entire application program can be contained in one application user module, so too can an entire operating system be contained in one operating system module.

The first step of the search for a "part-A" operating system module is to initialize an OS loop counter to 0. Next, a module select counter is initialized to 0. Keying off the value of the module select counter, which is initialized to 0, processor 22 causes module select circuit 56 (FIGS. 1 & 4) to enable the module select line corresponding to the module select counter value. The first such module select line enabled is module select line 0 (M0 in FIG. 1). Assuming a module is plugged into the enabled user module connector slot, processor 22 will read a module ID block from the user module. Each user module 102, regardless of the module type, will have a module ID block. This block contains information relating to the module such as the module type, module name, family tree, and an ID number.

The module type information indicates whether the module is an operating system module, a RAM module, an application program module, or the portion of an I/O module which plugs into a user module connector slot. The module name can be up to 40 characters and is used as the module header when the module is enabled. The family tree information indicates whether the module is a part A, B, C, or D module and also indicates the family members associated with this module, that is, whether a single module is sufficient or whether additional modules are needed. The module ID number is used to serialize modules and differentiate between later versions of modules which may have the same program or operating system name, such as would happen when a particular application program is updated.

After reading the module ID block, processor 22 then determines the particular type of module which is in the enabled user module connector slot. If it is not an operating system module, processor 22 increments the module select counter and then checks the module select counter to determine if its count is less than seven. If the count is less than seven, the last socket has not been checked and processor then enables the corresponding user module connector slot. Processor 22 again reads the module ID block of the module plugged into the enabled user module connector slot and checks to determine whether or not it has found an operating system module.

Returning to the step in which processor 22 checks the module select counter to determine if its count is less than seven, if the module select counter is not less than seven, the last socket has been checked and processor 22 branches to the step where it determines if an operating system module was found. If an operating system module was not found processor 22 halts. If an operating system module was found, processor 22 next checks to see if a part (B, C, D) operating system module is required. If one is not, processor 22 branches to B. If one is processor 22 searches for such a part (B, C, D) operating system module and returns to the step where the module select counter is initialized to zero.

Returning to the step in which processor 22 determines if it has found an operating system module, upon the determination that it has found an operating system module, processor 22 branches to the step of storing the ID block and socket number. Processor 22 next checks to determine if multiple part (A, B, C, D) operating system modules were found. If multiple part (A, B, C, D) operating system modules were found, processor 22 causes an error message to be displayed and then halts. If multiple part (A, B, C, D) operating system modules were not found, processor 22 branches to the step of incrementing the module select counter. Processor 22 then goes to the step where it determines if the last socket has been checked by testing to see if the module select counter is less than seven.

Figure 7C:
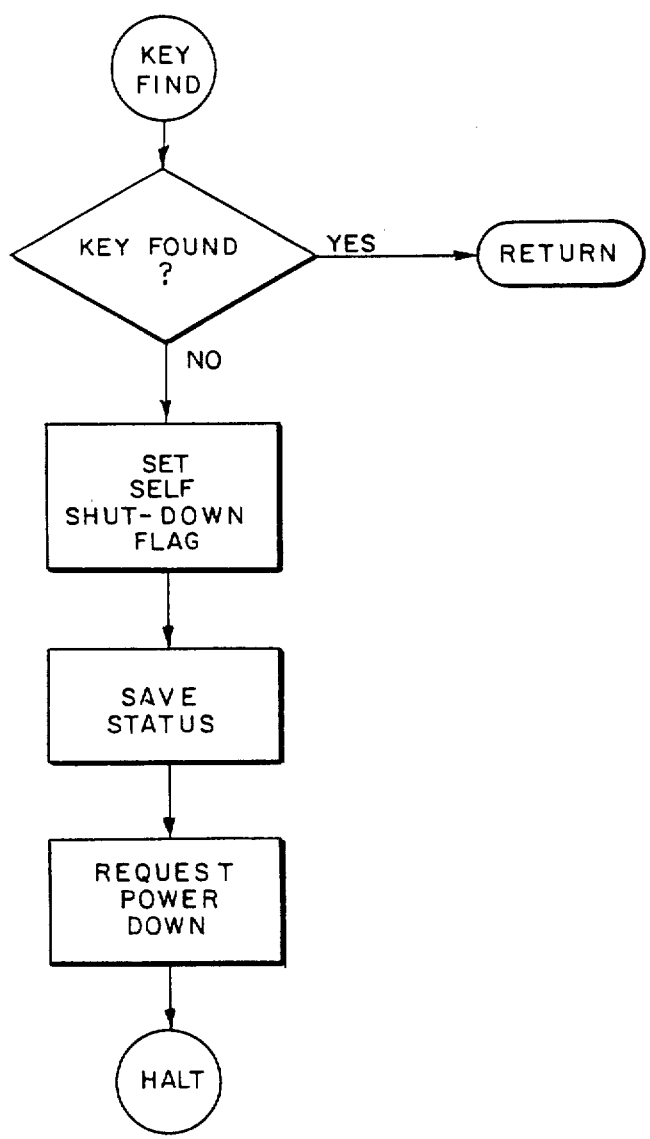

Once all necessary operating system modules have been found and enabled, processor 22 begins executing the operating system program contained in the enabled operating system modules. As shown in FIG. 7-b, the first step taken under control of a plug-in operating system is to check a self shutdown flag stored in system RAM 38 (FIG. 1). If that flag is set, the status of the system is restored as it was when the system was last shutdown and the self shutdown flag is also reset. If the self shutdown flag was not set, a search is initialized for a part-A application module.

Figure 8:
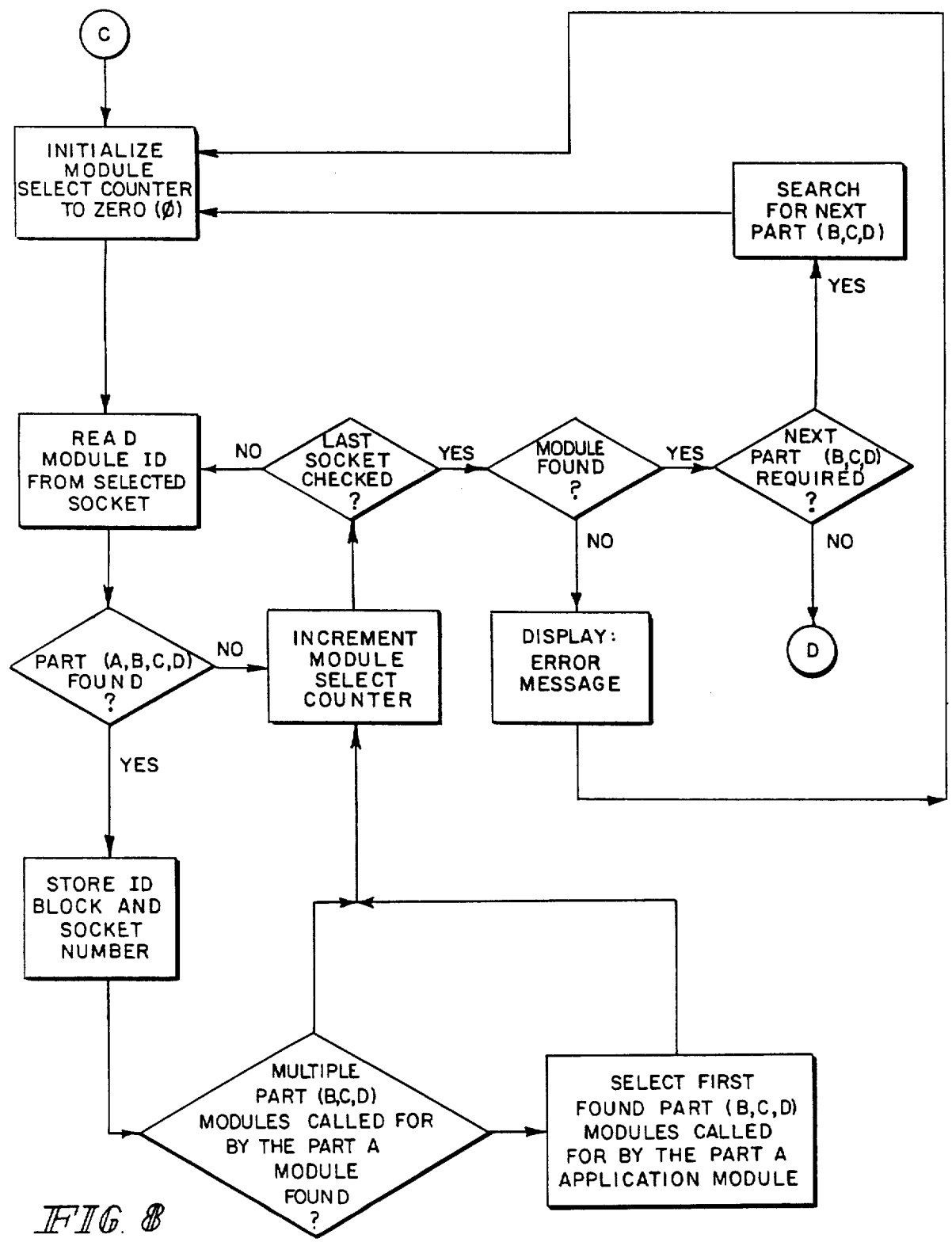
FIG. 8 illustrates a flow chart of a sequence of steps for locating application program modules according to the present invention.

The portion of the flow chart of FIG. 7b between the circled C and circled D, shown in greater detail in FIG. 8, shows that an application program module is found in the same manner that an operating system program module is found. A module select counter is initialized to 0. The user module corresponding to the module select counter is enabled and the module ID block read from the module in the enabled connector slot. Initially, an appropriate application program module would be a "part-A" application program module. Processor 22 determines from the module ID block if an appropriate application program module has been found. It it has not, the module select counter is incremented and the count in the module select counter compared to seven. If it is less than seven, the corresponding user module connector slot is enabled, and the module ID block is read from the module in the enabled slot. If the module select counter is not less than seven, a check is made to see if any application module was found. If one was not, an error message is displayed. The module select counter is then initialized to 0 and the search process begun again.

If any application module was found, the program next checks to see if a part (B, C, D) application module is needed. If one is not, the program branches to D. If one is, the program searches for such a module and returns to the step where the module select counter is initialized to zero to begin this search.

If processor 22 determines from the module ID block it read that an appropriate application program module has been found, the module ID block and socket number is stored. Next, a check is made to determine if multiple part (B, C, D) application modules called for by the part A application module were found. If they were, the first found part (B, C, D) application modules called for by the part A application module are selected and the program branches to the step where the module select counter is incremented. If multiple part (B, C, D) application modules called for by the part A application module were not found, the program branches to the step where the module select counter is incremented.

Once processor 22 determines that all necessary application program modules are present, it calls the "KEY FIND" subroutine. It should be understood that information indicating whether RAM user modules are needed would also be contained in the module ID block, typically as part of the family tree information of either the application program user module(s) or the operating system user module(s). Any needed RAM modules would be located and enabled in a manner similar to that just described.

Referring to FIG. 7-c, the "KEY-FIND" subroutine checks to see if a key has been entered. If one has, the "KEY-FIND" subroutine returns from where it was called with the key value. If the "KEY-FIND" subroutine finds that a key was not entered, it causes a portion of the system to be powered down. When it does so, it causes the self shutdown flag to be set, causes the system status to be saved and requests a power down from controller 42. It then causes a halt to permit all RAM accesses to terminate before power down by controller 42.

Once entry of a key is detected, the program determines which key has been pressed. The keys which are currently being discussed are the special function keys which control the operation of the computer. If the key detected is the program select key, the program branches to search for the next application program. This search is accomplished in the same way as the search for the application program module just described was, as can be seen from the flow sequence in the flow chart.

If the key entered was not a program select key, the program next determines if the key entered was the calculator key. The computer has typical calculator functions implemented in the software of the operating system user module which is enabled for use with the desired application program. If the calculator key is depressed, the program branches to the calculate mode as indicated by the circled G. The calculate program is illustrated in the flow chart of FIG. 9.

Figure 9:
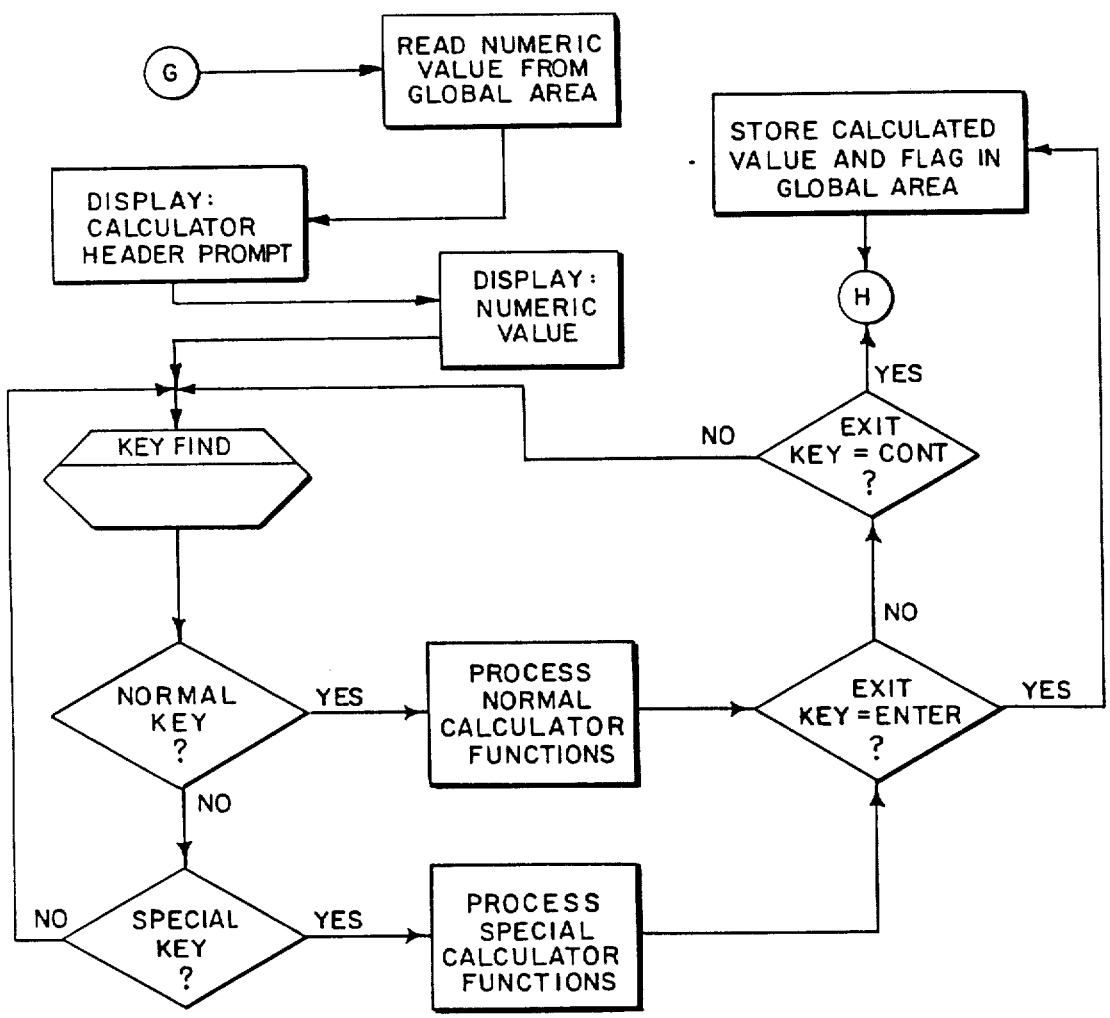
FIG. 9 illustrates a flow chart of a sequence of steps for the calculate mode according to the present invention.

Referring now to FIG. 9, the program first attempts to read a numeric value from a global area. If a numeric value needs to be transferred to the calculator from an application program, the numeric value is placed in the global area. The program next generates a calculator header prompt message for LCD 60. This message informs the operator that the computer is in the calculator mode. Next the program causes the numeric value to be displayed on LCD 60. If a numeric value was not read from the global area, the program causes LCD 60 to display blanks. The program then calls the "KEY-FIND" subroutine. Once the program finds that a key has been entered, it checks to determine if the key is a "normal" key. The term "normal key" refers to a hardkey on the keyboard.

If the key entered is not a "normal" key, the program next checks to determine if it is a "special" key. Although not necessary for the operation of the system, special calculations can be added to the software in the operating system user module and these functions assigned to particular keys. Such special functions might include, for example, the calculation of a mean or standard deviation in a statistical type of application program family. This would be a "special" key function. If the key entered is not a "special" key, the program returns to call the "KEY-FIND" subroutine. It should be understood that while the program is in the calculate mode, only two types of keys can be entered, "normal" keys and "special" keys.

If the program determines that a "normal" key has been entered, it executes the particular calculator function assigned to that key. If a special key is detected, the special function assigned to that key is processed. Regardless of whether the program has processed a special key or a normal key, the program next determines whether it should exit the calculate mode.

There are two ways of exiting the calculate mode. If the "ENTER" key is detected, the program branches to store the value just calculated and sets a flag in a global area which illustratively could be in system RAM 38 or in a RAM user module. The program then returns to the point indicated by the circled H where the program is waiting for a key to be entered as shown in FIG. 7-b.

The other method of exiting the calculate mode is for the operator to press the "CONT" key. This causes the program to return to the step indicated by the circled H without storing the calculated value or setting the flag in the global area. The purpose of permitting an operator to exit the calculate mode and store the calculated value in the global area is to permit an application program to access the global area and get the calculated value. Therefore, application programs can be written without computational steps that would otherwise be needed. These steps can be performed by the operator by jumping into the calculate mode, performing the calculations by hand in the calculate mode, and then returning to the application program with the value stored in the global area for subsequent access by an application program.

If entry of neither the "ENTER" or the "CONT" key is detected, the program remains in the calculate mode and branches back to call the "KEY-FIND" subroutine.

Referring back to FIG. 7-b, if a calculator key is not detected, the program next determines whether a set-up key has been pressed. If entry of the set-up key is detected, the program jumps into the file system segment of the program as indicated by the circled I.

Figure 10:
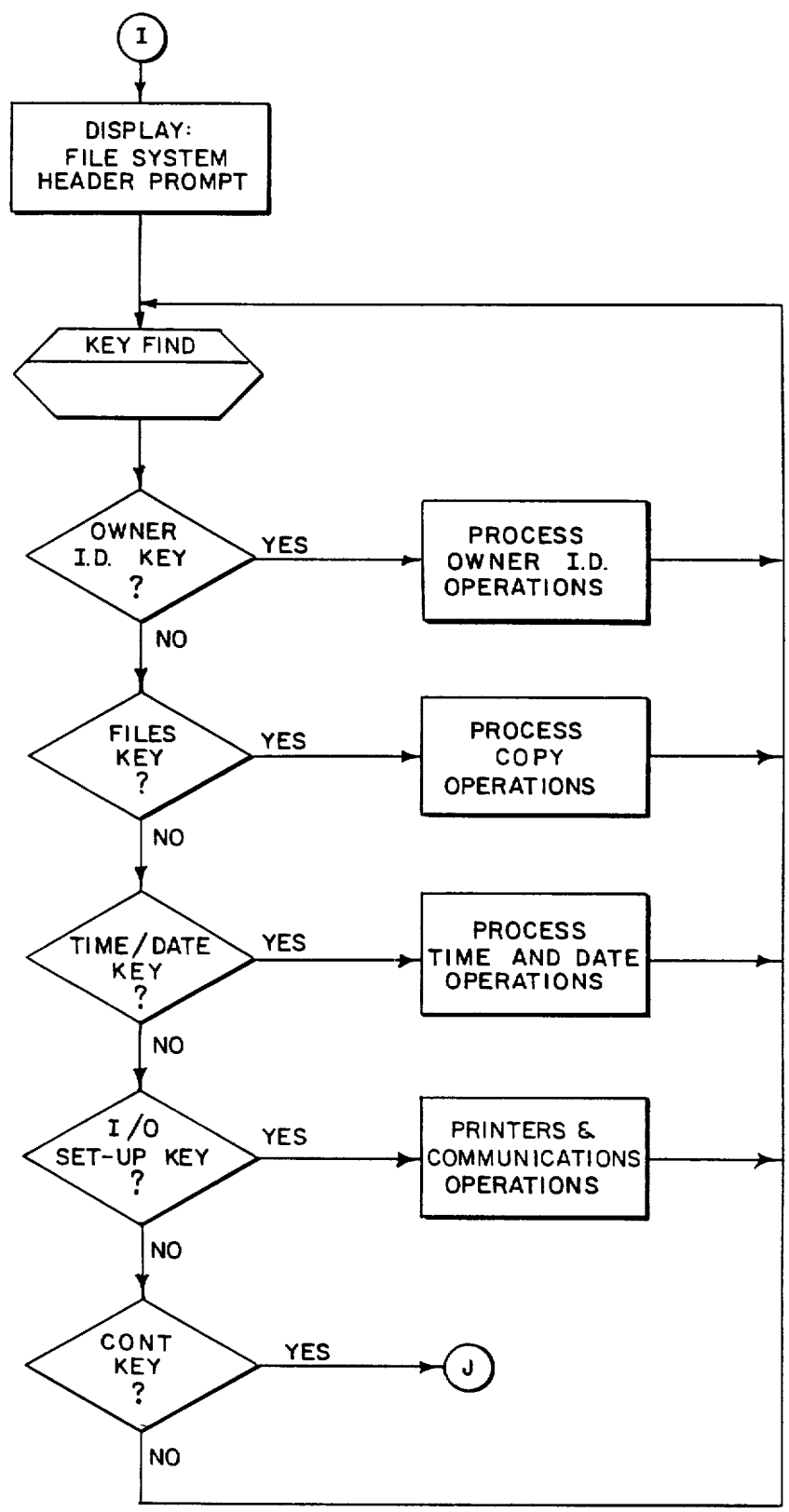
FIG. 10 illustrates a flow chart of a sequence of steps for a file system program according to the present invention.
Figure 11B:
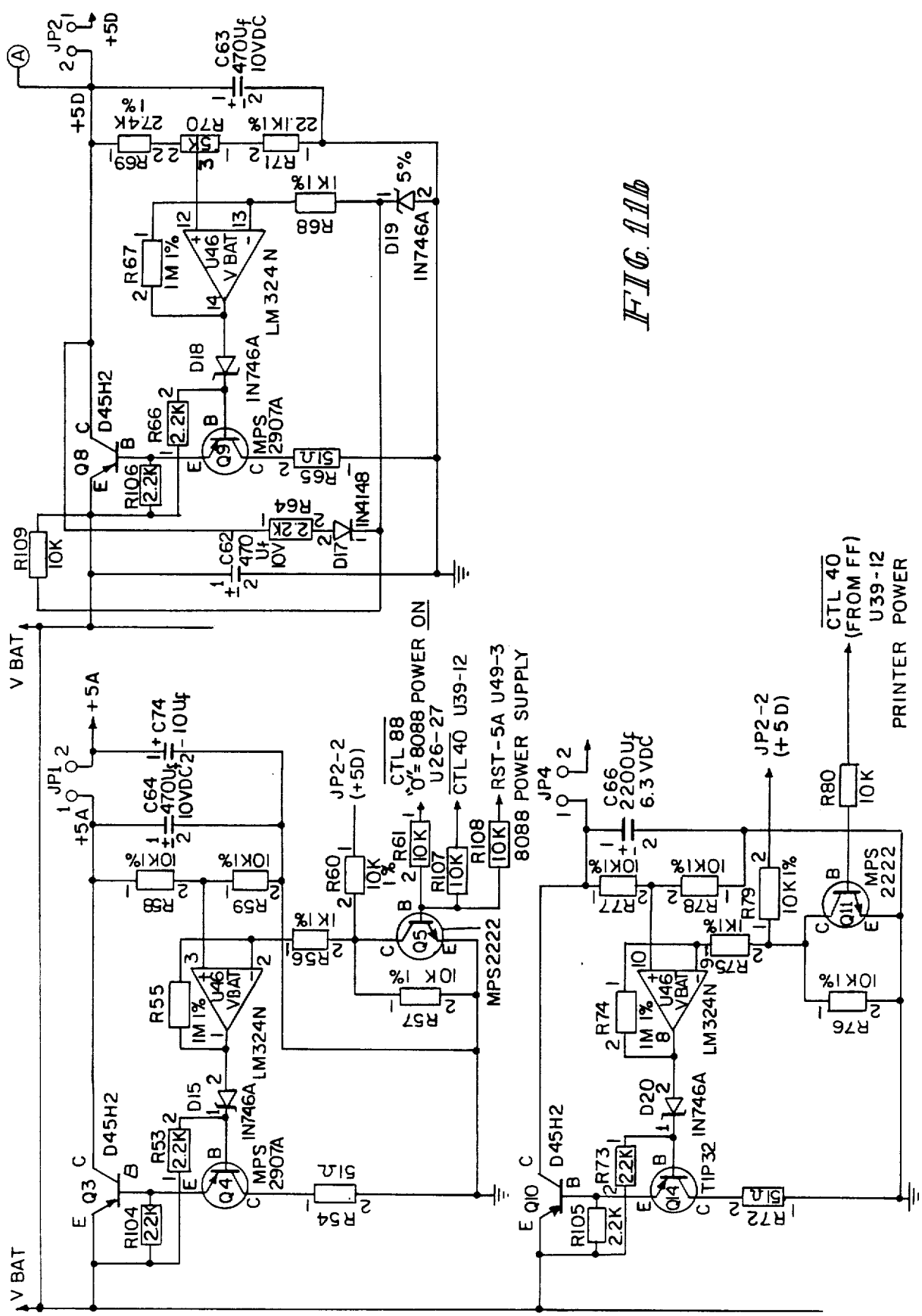
Figure 11C:
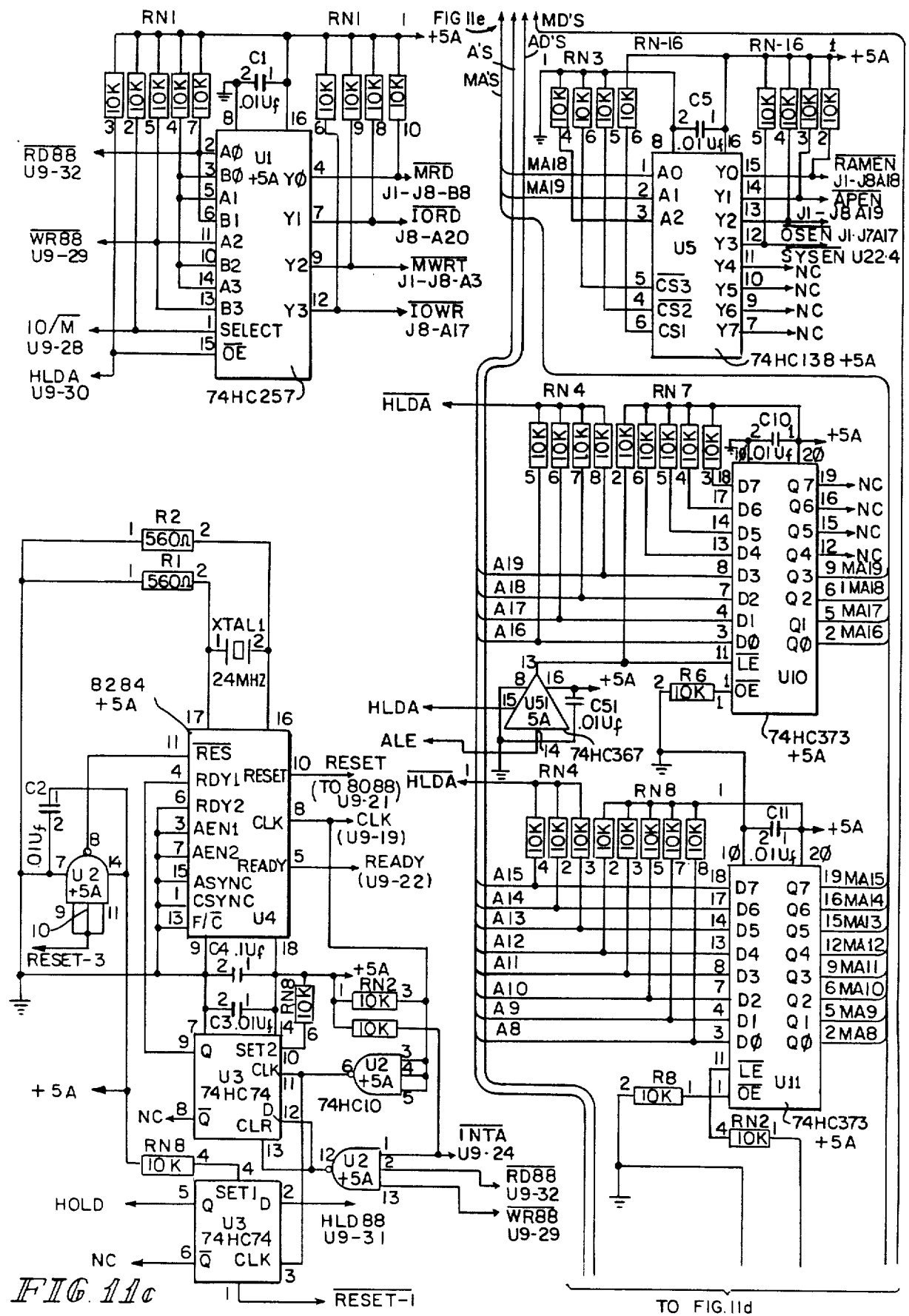
Figure 11D:
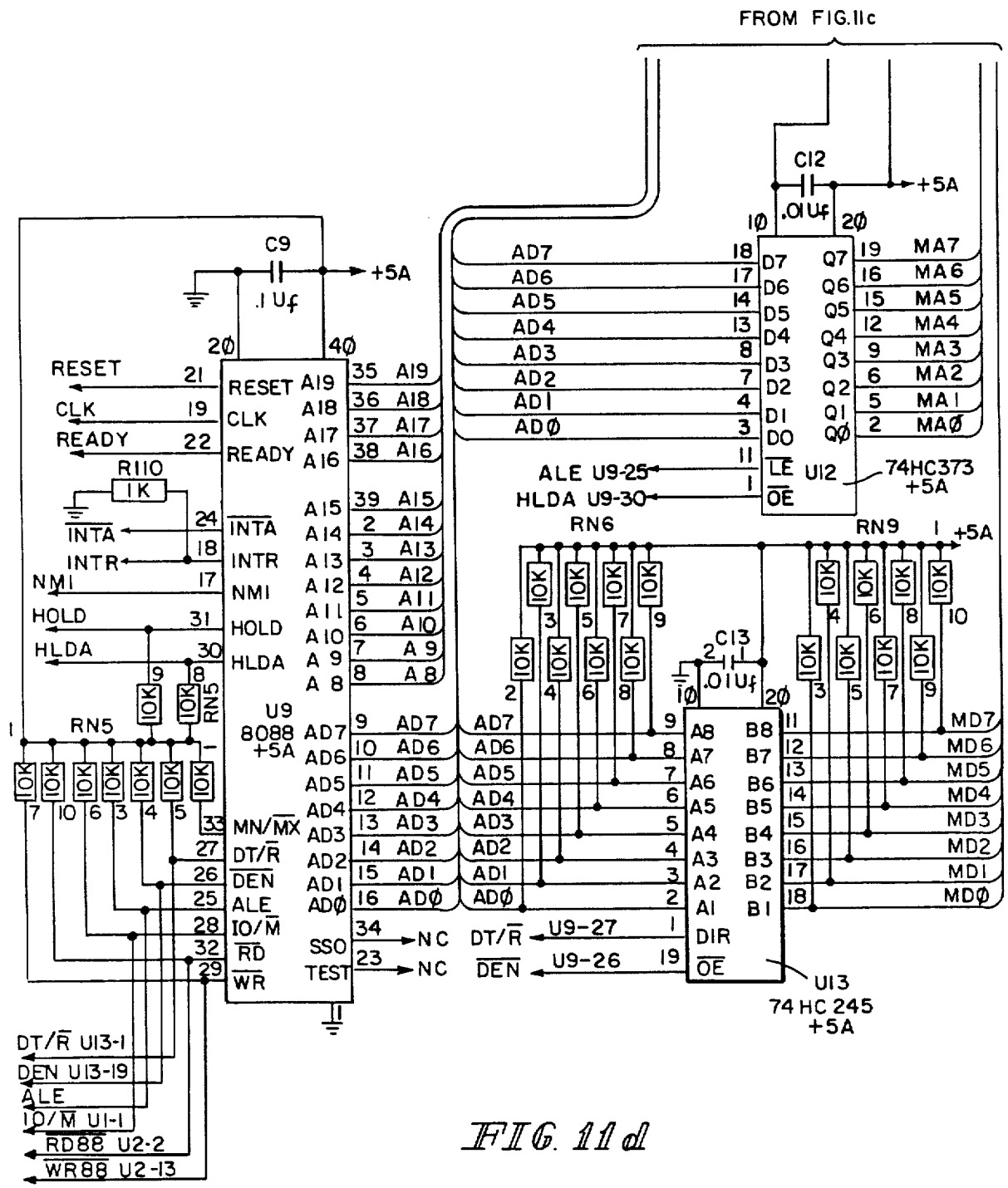
Figure 11E:
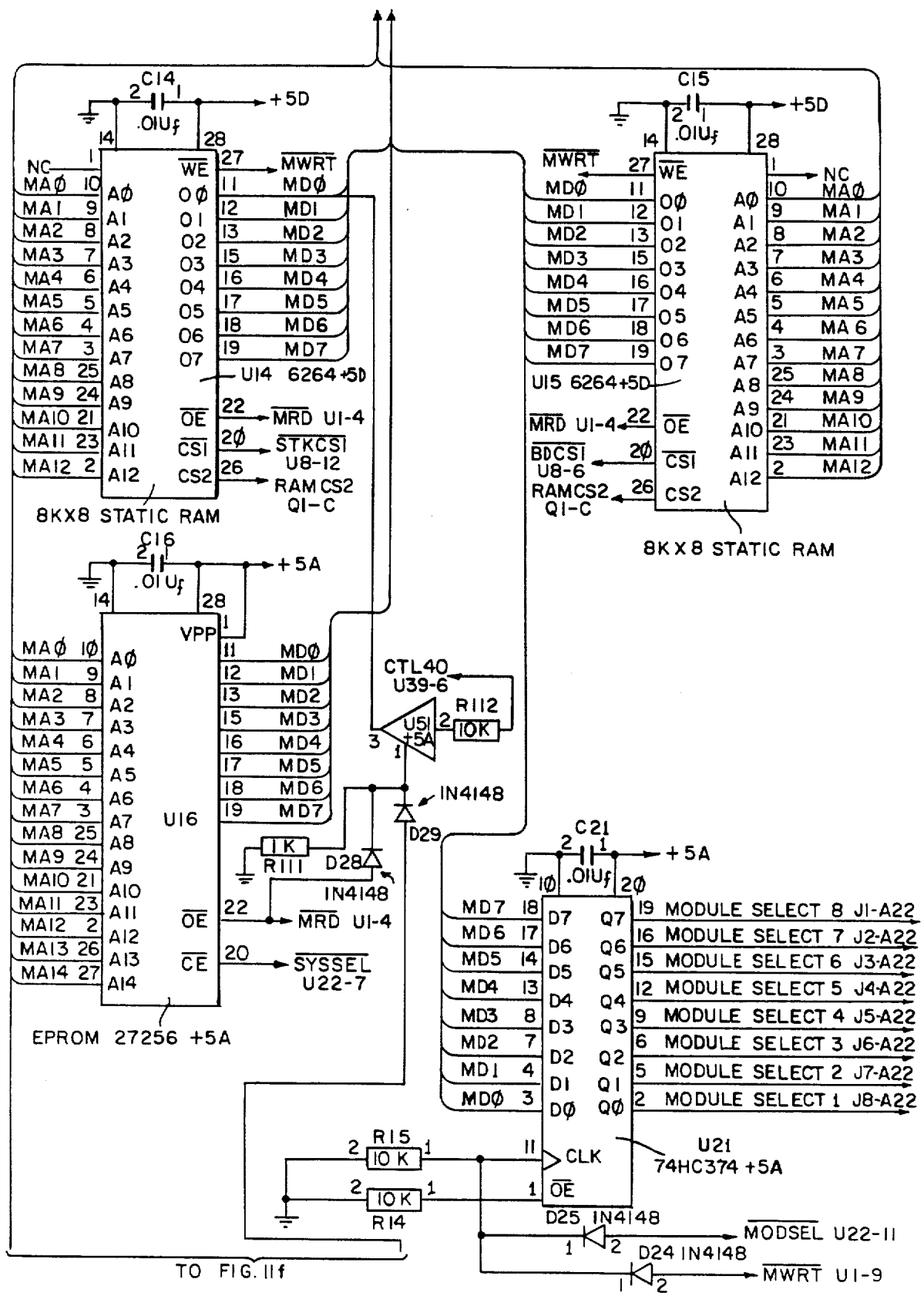
Figure 11F:
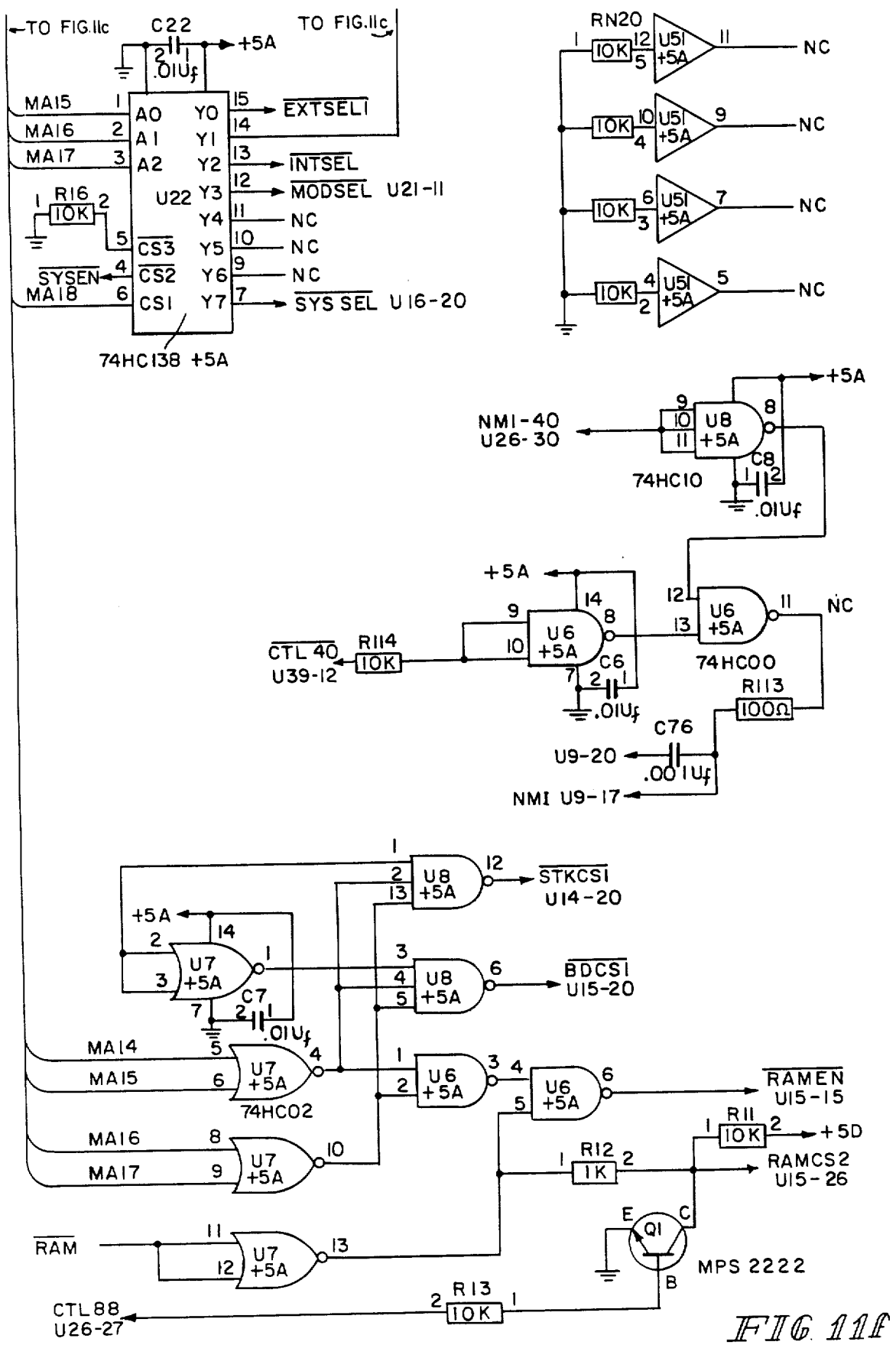
Figure 11G:
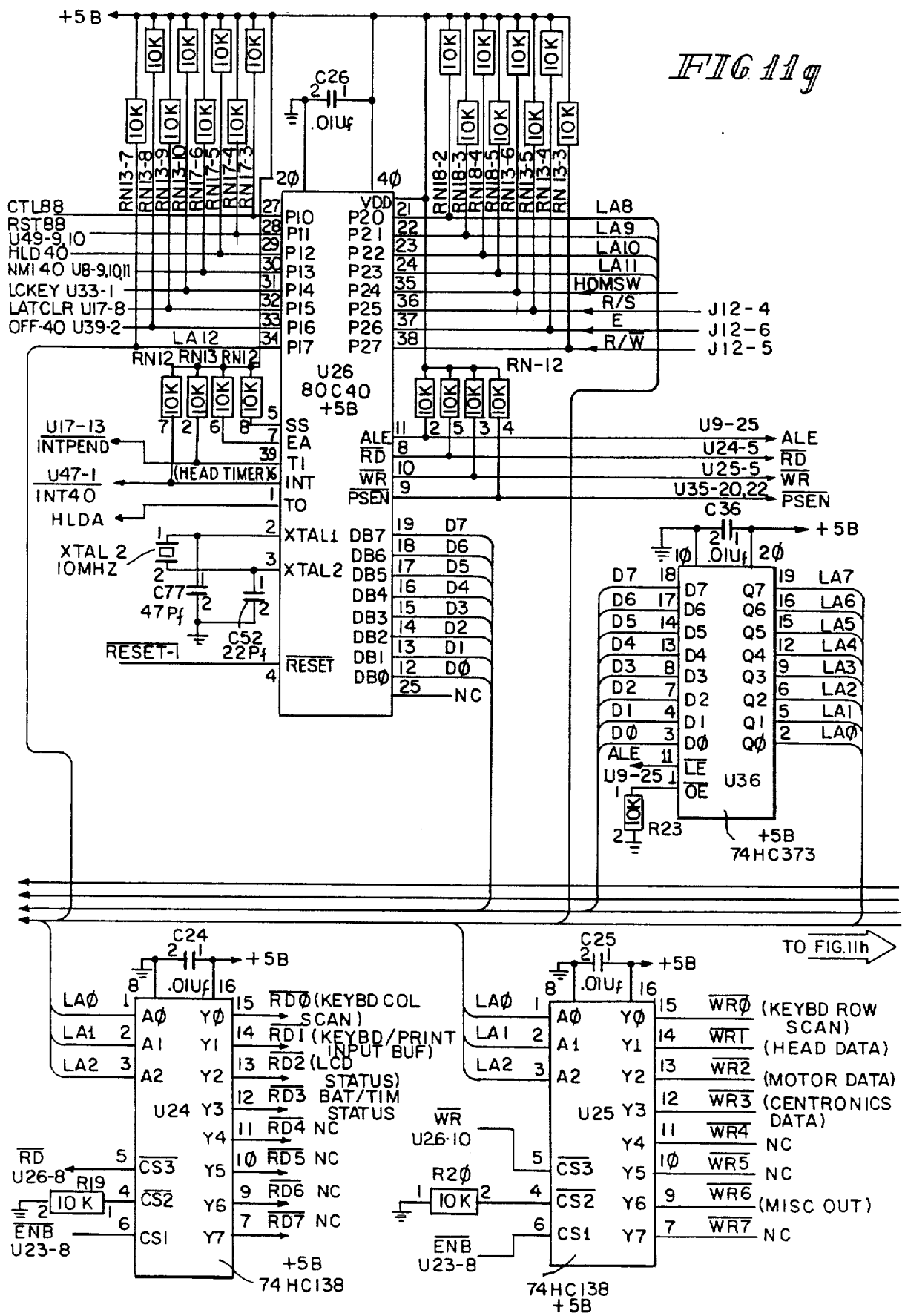
Figure 11H:
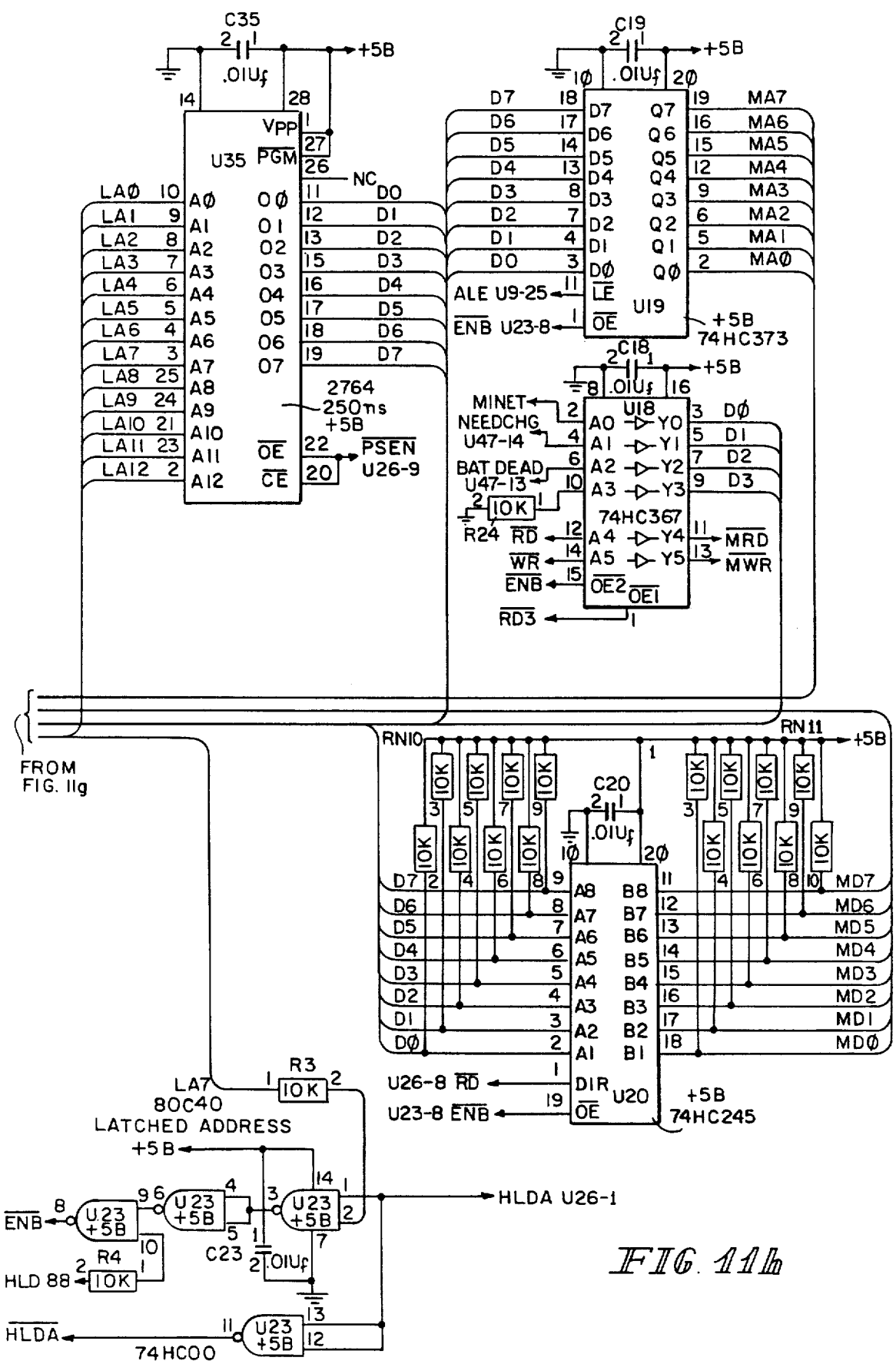
Figure 11I:
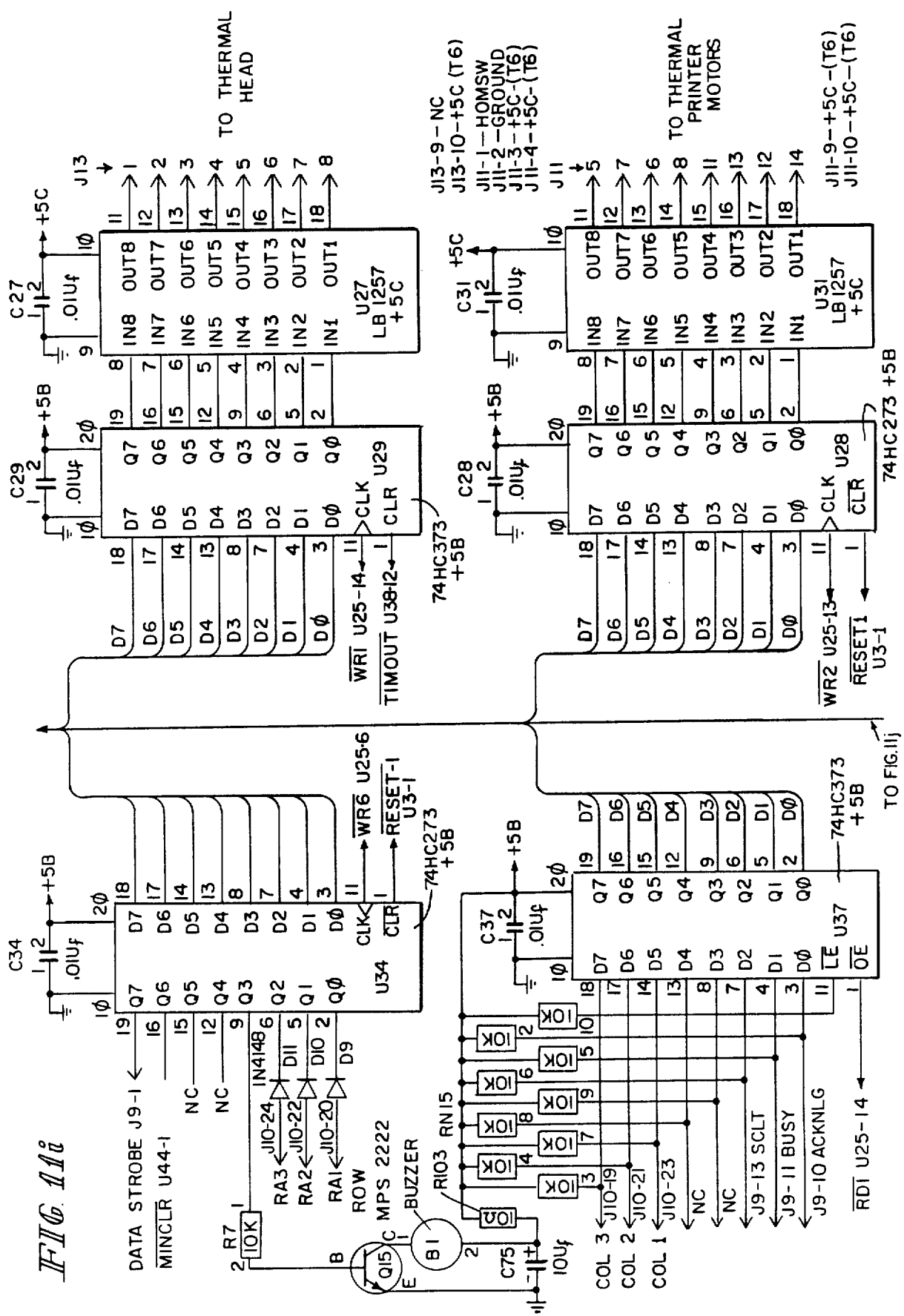
Figure 11J:
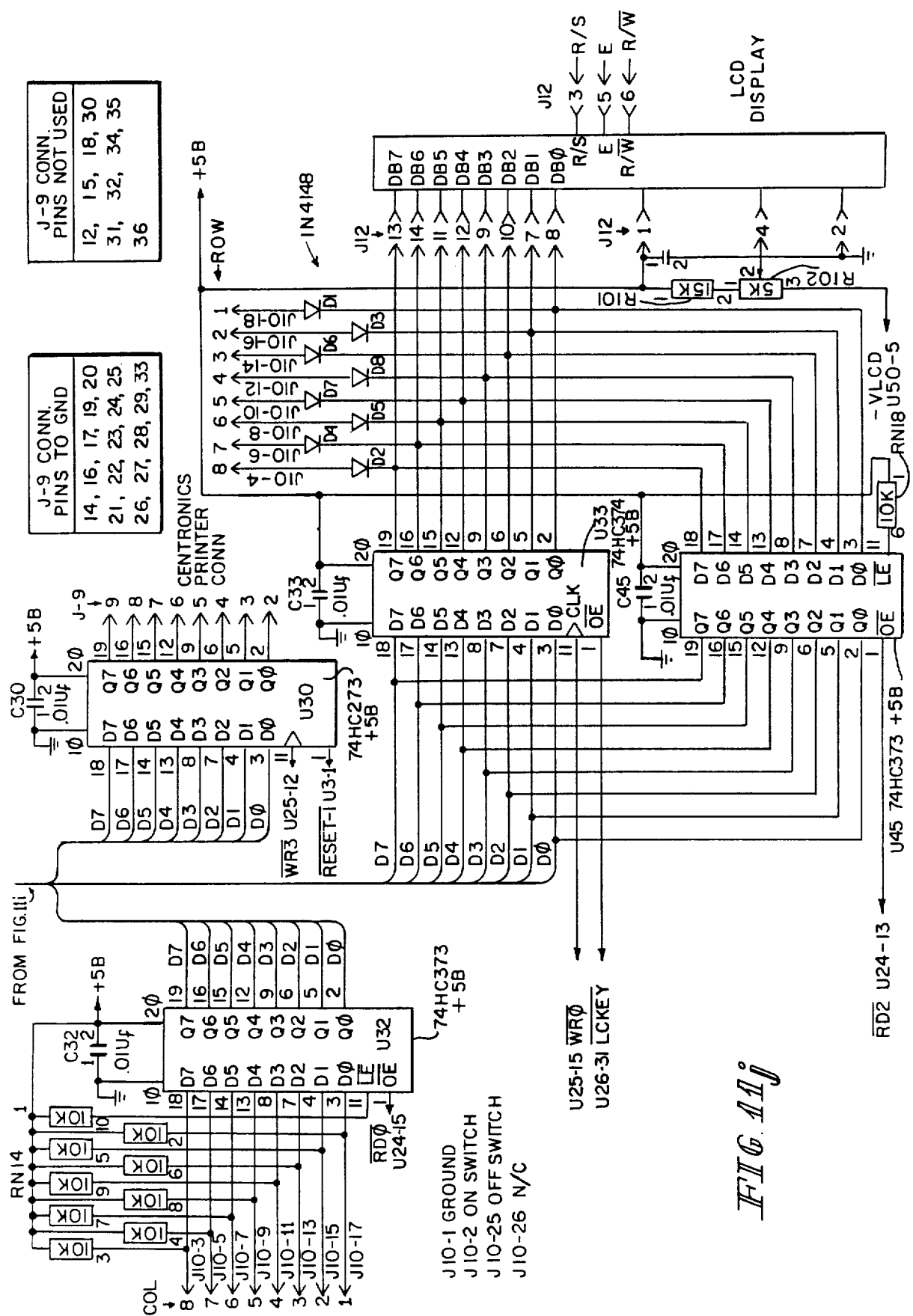
Figure 11K:
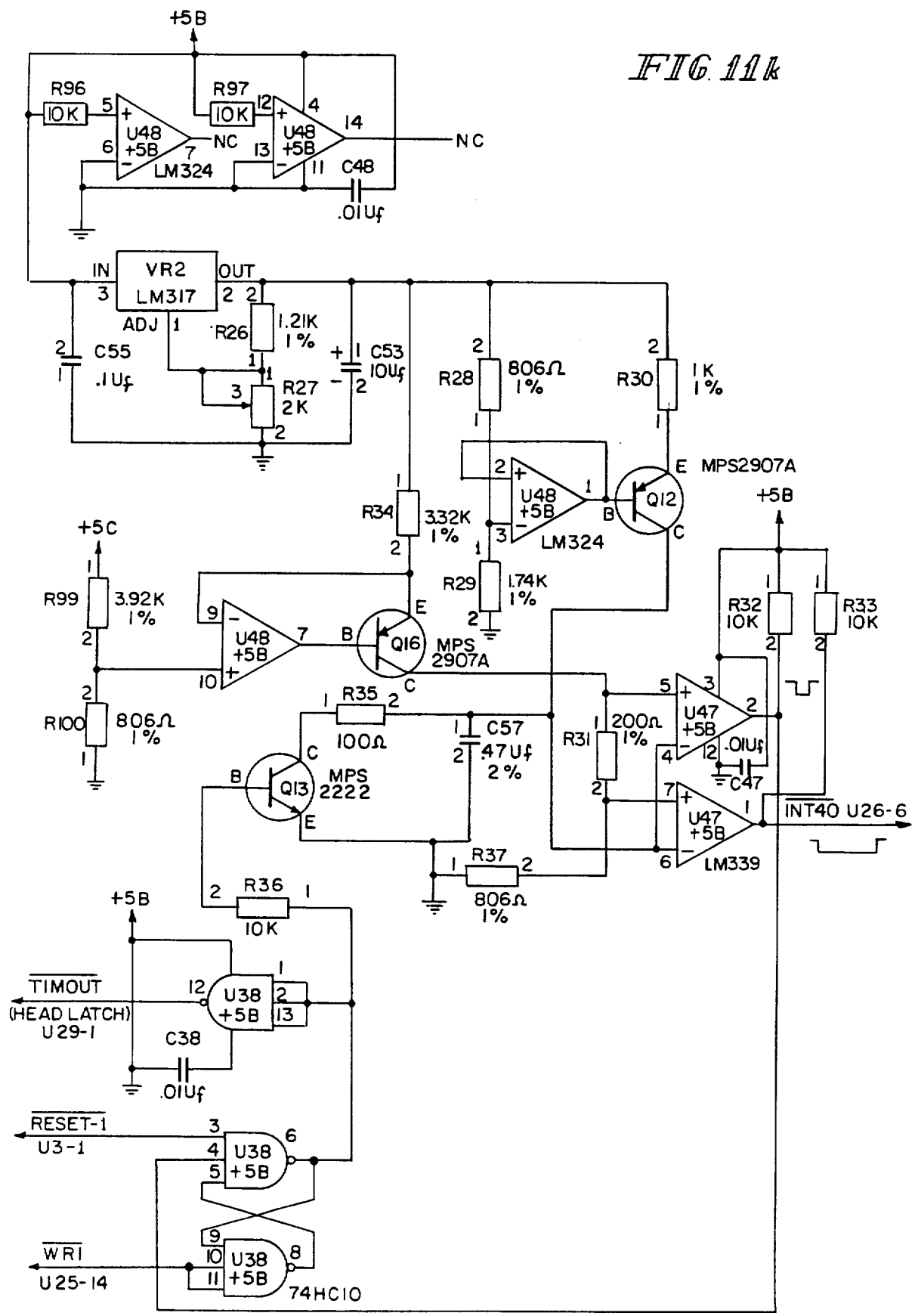
Figure 11L:
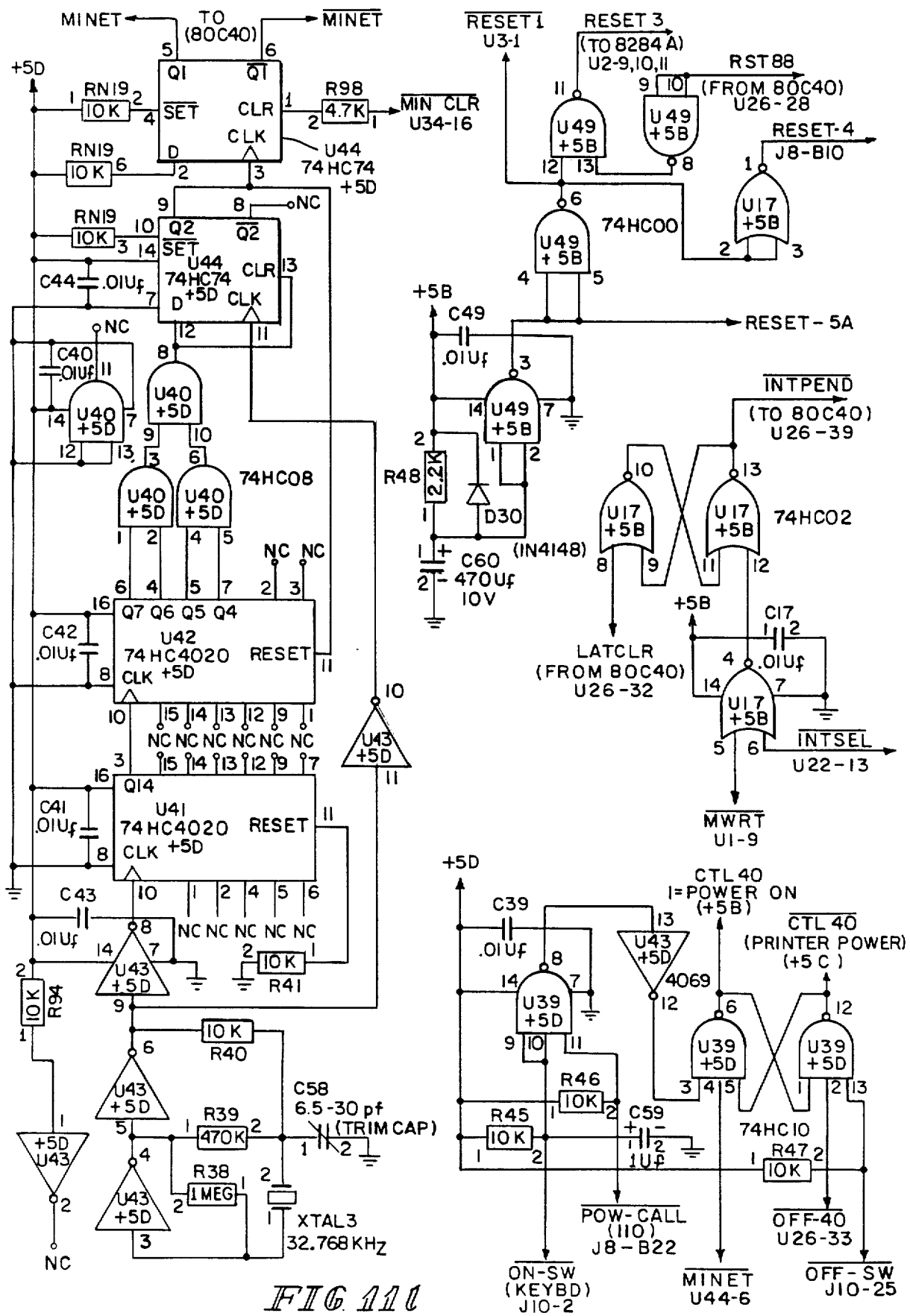

Referring to FIG. 10, a typical flow diagram for a "file system" program is illustrated. The program implementing the "file system" illustratively comprises part of the program stored in the operating system user module. The first step in the program is to display a header prompt which informs the operator that he is in a particular "file system" program and to enter the appropriate soft-key. Again, a soft-key is a key whose function is determined by the software residing in the operating system user module. Illustrative of the soft-keys which could be depressed are the owner I.D. key, the file key, the time/date key, the I/O set-up key and the "CONT" key. The file system program first calls the "KEY-FIND" subroutine and upon return from the "KEY-FIND" subroutine checks to see if the owner I.D. key was entered. If the owner I.D. key was entered, the program executes certain owner I.D. operations. These owner I.D. operations can be stored in an individual application program whose module is currently inserted in a user module connector slot in system bus 18 and can illustratively comprise information identifying a certain individual by name, address, Social Security number and any other desired information.

If the key detected is not an owner I.D. key, the program next checks to determine if the copy module key was entered. If the copy module key was entered, the program processes certain file operations. These file operations typically comprise transferring information from one RAM-type user module to a second RAM-type user module. Again, this information can be whatever is desired and whatever is programmed into the operating system module containing the "file system" portion of the program.

If entry of the copy module key is not detected, the program determines if a time/date key was entered. If the time/date key was entered, the program executes certain time and date operations which permit the operator to set and change the current time and date settings. Again, these operations are flexible and can be programmed as needed.

As presently contemplated, RAM user modules can be configured as mass storage devices similar to magnetic disks. The file system program typically handles the functions needed to configure RAM user modules. Illustrative functions include creating a file, opening a file, closing a file, and deleting a file. The file system program also handles the functions needed to transfer data into and out of a mass storage-configured RAM module, such as by inserting a record, reading a record, writing a record, and deleting a record.

The next step in the program's comparison string is to check for entry of an I/O set-up key. When entry of this key is detected, the file system program segment executes certain I/O operations. Illustratively, these operations comprise communication operations between the computer and external sources and also the transfer of data to be printed to the printers.

The last step in the file program's comparison string is to see if the "CONT" key has been entered. If the "CONT" key was not entered, the file system program segment returns to call the "KEY-FIND" subroutine. If the "CONT" key was entered, the file system program segment is exited and the program waits for a key to be entered as indicated by the circled J in FIG. 7-b. Referring back to FIG. 7-b, if a set-up key was not detected, the program defaults to running a selected application program.

An application program written is for a specific purpose. There may be various levels within the application program. Illustratively, the program select key may be utilized to index from a lower level to a higher level within the application program each time it is depressed. Once the highest level within an application program has been reached, the detection of a program select key will cause the execution of the application program to be terminated and control returned to the operating system program illustrated in FIG. 7-b wherein the program branches to search for the next application program.

FIGS. 11(a)–11(m) are schematics of a working embodiment of the processor board section of the invention as presently known to the inventors. The following table contains illustrative part types of the various integrated circuits shown in FIG. 11.

| U1 | 74HC257 | Texas Instruments |
|---|---|---|
| U2 | 74HC10 | Texas Instruments |
| U3 | 74HC74 | Texas Instruments |
| U4 | 8284 | Intel |
| U5 | 74HC138 | Texas Instruments |
| U6 | 74HC00 | Texas Instruments |
| U7 | 74HC02 | Texas Instruments |
| U8 | 74HC10 | Texas Instruments |
| U9 | 8088 | Intel |
| U10 | 74HC373 | Texas Instruments |
| U11 | 74HC373 | Texas Instruments |
| U12 | 74HC373 | Texas Instruments |
| U13 | 74HC245 | Texas Instruments |
| U14 | 6264 | Toshiba |
| U15 | 6264 | Toshiba |
| U16 | 27256 | Intel |
| U17 | 74HC02 | Texas Instruments |
| U18 | 74HC367 | Texas Instruments |
| U19 | 74HC373 | Texas Instruments |
| U20 | 74HC245 | Texas Instruments |
| U21 | 74HC374 | Texas Instruments |
| U22 | 74HC138 | Texas Instruments |
| U23 | 74HC00 | Texas Instruments |
| U24 | 74HC138 | Texas Instruments |
| U25 | 74HC138 | Texas Instruments |
| U26 | 80C40 | Toshiba |
| U27 | LB1257 | Sanyo |
| U28 | 74HC273 | Texas Instruments |
| U29 | 74HC373 | Texas Instruments |
| U30 | 74HC273 | Texas Instruments |
| U31 | LB1257 | Sanyo |
| U32 | 74HC373 | Texas Instruments |
| U33 | 74HC374 | Texas Instruments |
| U34 | 74HC273 | Texas Instruments |
| U35 | 2764 | Texas Instruments |
| U36 | 74HC373 | Texas Instruments |
| U37 | 74HC373 | Texas Instruments |
| U38 | 74HC10 | Texas Instruments |
| U39 | 74HC10 | Texas Instruments |
| U40 | 74HC08 | Texas Instruments |
| U41 | 74HC4020 | Texas Instruments |
| U42 | 74HC4020 | Texas Instruments |
| U43 | 4069 | National Semiconductor |
| U44 | 74HC74 | Texas Instruments |
| U45 | 74HC373 | Texas Instruments |
| U46 | LM324N | National Semiconductor |
| U47 | LM339 | National Semiconductor |
| U48 | LM324 | National Semiconductor |
| U49 | 74HC00 | Texas Instruments |
| U50 | ICL 7660 CPA | Intersil |
| U51 | 74HC367 | Texas Instruments |
| VR1 | LM317T | National Semiconductor |
| VR2 | LM317 | National Semiconductor |
| XTAL 1 | 24 MHZ | NDK America Inc. |
| XTAL 2 | 10 MHZ | NDK America Inc. |
| LCD | DMC 40218 | Optrex Corporation |

The address for Intel has been given previously. Texas Instruments' address is Post Office Box 5012, Dallas Tex. 75222. National Semiconductor's address is 2900 Semiconductor Drive, Santa Clara, Calif. 95051. Toshiba America, Inc.'s address is 2441 Michelie Dr., Tustin, Calif. 92680, Hitachi America, Ltd's. address is 1800 Bering Dr., San Jose, Calif. 95112. Sanyo's address is 1333 Lawrence Expressway, Suite 116, Santa Clara, Calif. 95051. NDK America, Inc.'s address is 10080 North Wolfe Rd., Cuppertino, Calif. 95014. Optrex Corporation's address is 3-14-9, Yushima BunkyaO-Ki, Tokyo 113, Japan. Intersil's address in 10710 N. Tantau Ave., Cuppertino, Calif. 95014.

Figure 12:
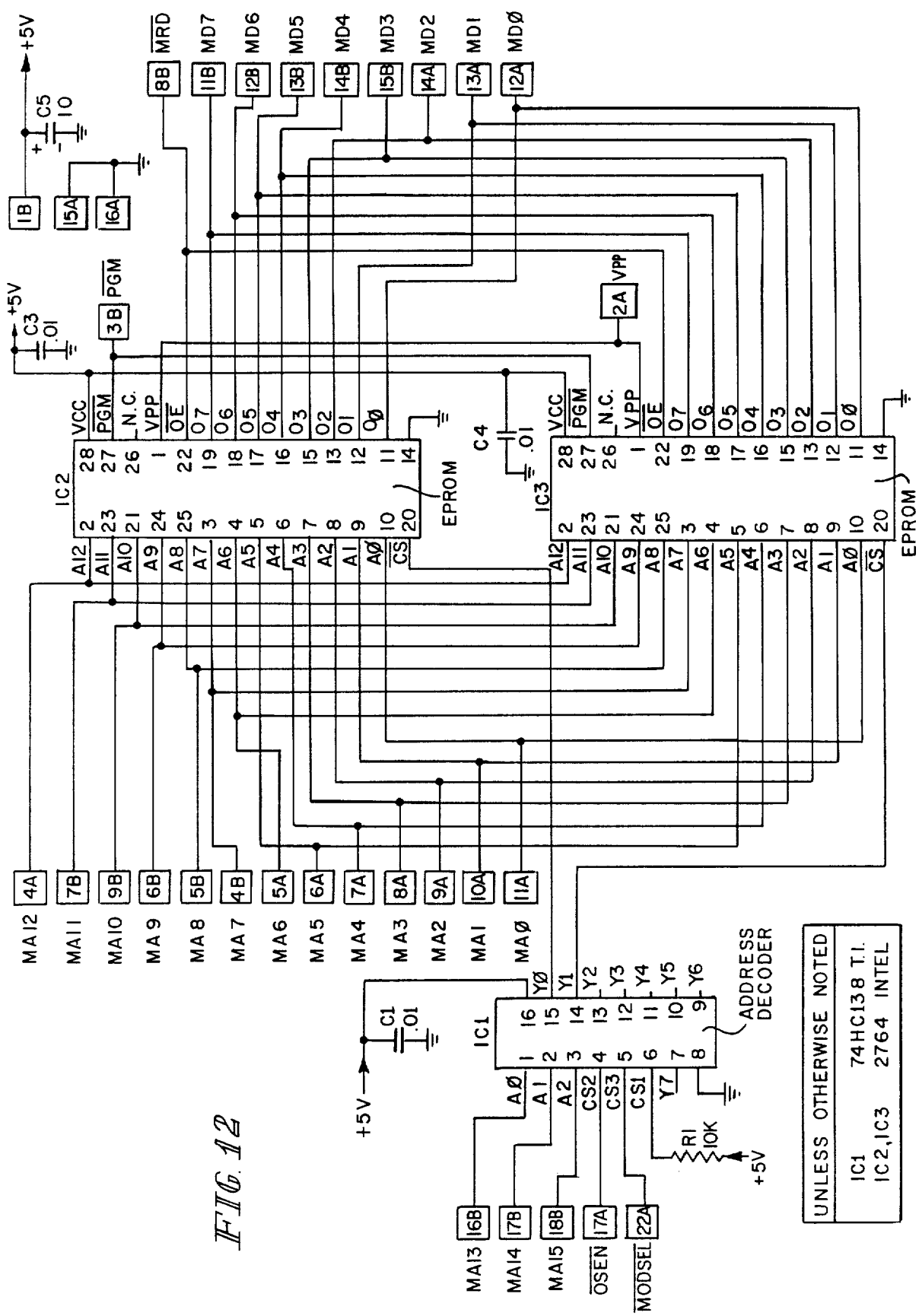
FIG. 12 illustrates a circuit schematic for an operating system user module according to the present invention.
Figure 13:
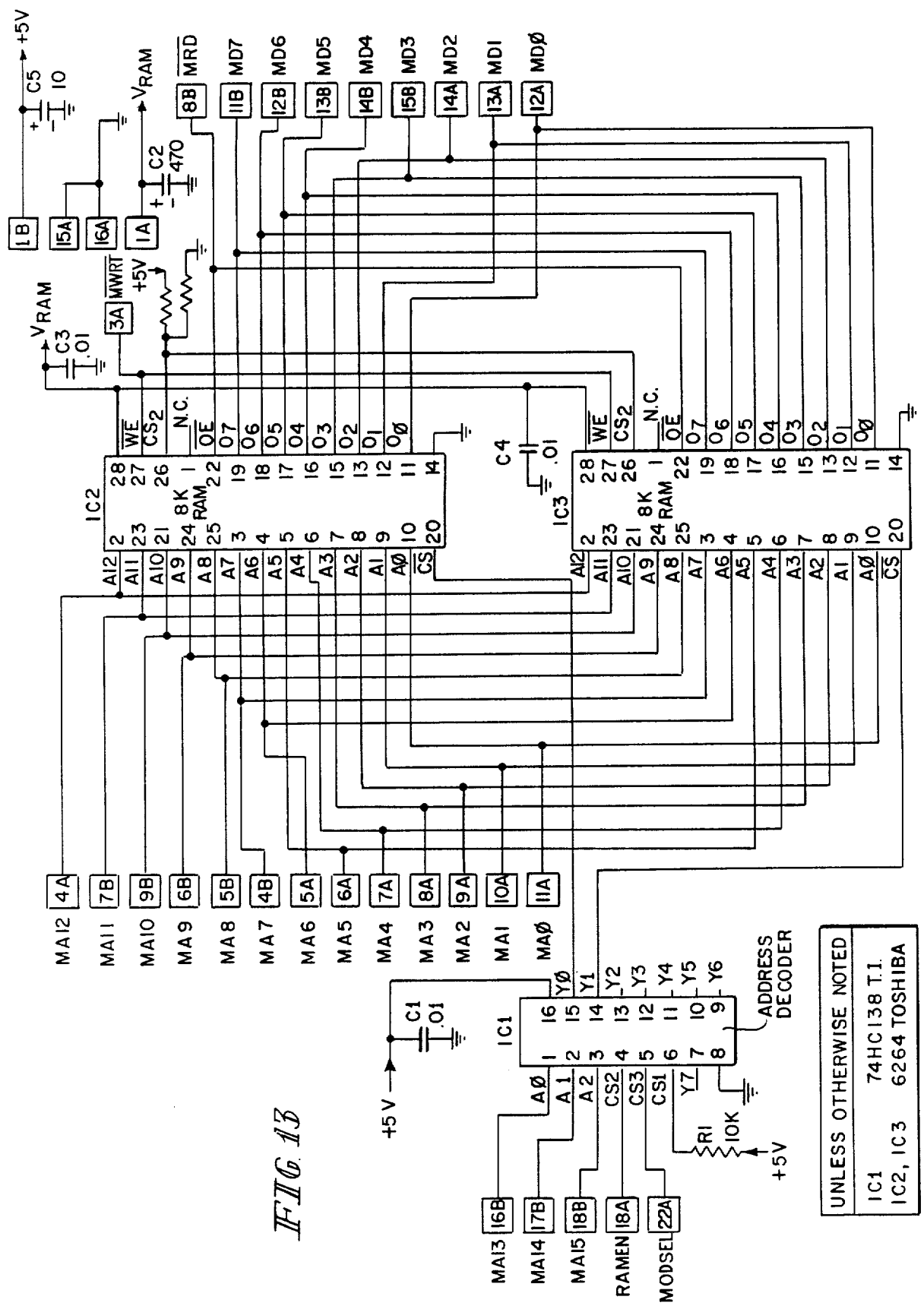
FIG. 13 illustrates a circuit schematic for a RAM user module according to the present invention.
Figure 14:
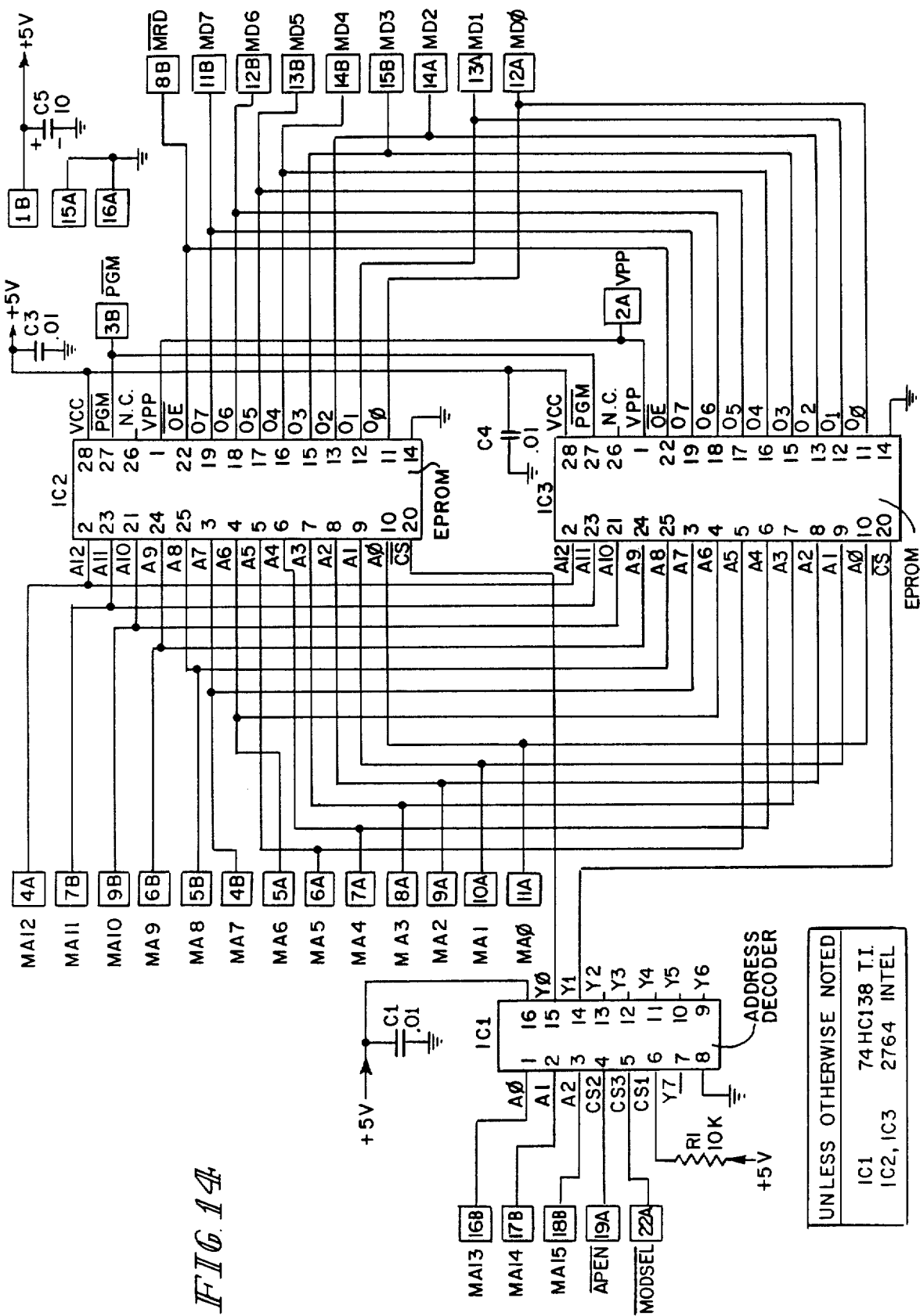
FIG. 14 illustrates a circuit schematic for an application program user module according to the present invention.

FIG. 12 illustrates a circuit schematic for an operating system user module. FIG. 13 illustrates a circuit schematic for a RAM user module. FIG. 14 illustrates a circuit schematic for an application program user module.

Appendix A is a program source listing of the program for processor 22 and a source listing for an illustrative operating system module. Appendix B is a set of detailed flow charts of the program for controller 42 and Appendix C is a program source listing of the program for controller 42.

Although the invention has been described in detail with reference to certain preferred embodiments and specific examples, variations and modifications exist within the scope and spirit of the invention as described and as defined in the following claims.

What is claimed is:

1. A computer comprising a processor including means for addressing memory;
  a plurality of memory modules, each memory module implementing, at least in part, a particular type of function of a plurality of types of functions, each function having a starting address, each function of the same particular type of function having the same starting address;
  means for coupling a plurality of memory modules to the processor;
  the processor including means for selectively enabling and disabling the memory modules coupled to it to implement no more than one function of each particular type of function at any one time by enabling for each particular type of function to be implemented only that memory module or those memory modules which implements or implement that one function of that particular type of function to be implemented;
  the selectively enabled module or modules comprising memory addressed by the processor's memory addressing means.

2. The computer of claim 1 wherein the particular types of functions include operating system programs, application programs, and random access memory (RAM), the means for coupling a plurality of memory modules to the processor includes means for coupling a plurality of memory modules containing a plurality of application programs to the processor, and the processor's means for selectively enabling and disabling memory modules includes means for selectively enabling and disabling the memory modules containing the plurality of application programs coupled to the processor to selectively enable the memory module or modules containing only one of the application programs at any one time.

3. The computer of claim 2 wherein the coupling means includes a plurality of connector slots for receiving the memory modules and at least one select line coupled to the processor and to each slot for enabling the memory module received in that slot when the select line coupled to the slot is asserted by the processor, the processor's means for selectively enabling and disabling the memory modules including means for asserting the select lines.

4. The computer of claim 3 wherein each memory module implementing an application program function includes means for identifying that memory module.

5. The computer of claim 4 wherein each memory module implementing an operating system program function includes means for identifying that memory module.

6. The computer of claim 5 wherein the memory module identifying means for the application program memory modules and the operating system program memory modules comprise for each such memory module a module identification block of information stored in the memory module wherein the information is related to the function type implemented by the memory module, a name for the memory module, an indication of related memory modules, and a memory module identification number.

7. The computer of claim 6 wherein the processor includes means for reading the module identification block of a selectively enabled memory module and determining if a memory module for a desired function has been enabled based upon the information contained in the module identification block.

8. The computer of claim 7 wherein the means for selectively enabling and disabling memory modules further includes second means for determining if the desired function is distributed among more memory modules than the enabled memory module, and means for enabling the additional memory modules among which the function is distributed and generating an error indication if any of such additional memory modules are absent.

9. The computer of claim 8 wherein the module identification block of each memory module implementing an application program or operating system program further contains information related to whether additional memory modules are needed to implement the function being implemented by that memory module and the second determining means determines whether additional modules are needed based on the information related to whether additional memory modules are needed.

10. The computer of claim 1 wherein the means for coupling the memory modules to the processor includes connector slots for receiving the memory modules and a system bus coupling the connector slots to the processor.

11. The computer of claim 10 wherein the system bus has a unique select line for each connector slot which is coupled from the processor to a respective connector slot, and the processor's means for selectively enabling and disabling the memory modules includes means for asserting each select line to selectively enable the memory module received in the connector slot to which the select line is coupled.

12. The computer of claim 11 wherein the processor includes a microprocessor, a microcomputer, and a dual port memory coupling the microprocessor to the microcomputer.

13. The computer of claim 1 wherein the means for selectively enabling and disabling the memory modules includes means for sequentially actuating the memory modules in some sequence, means for determining that an enabled memory module implements a desired function, and means for halting the sequential actuation upon such a determination and maintaining the enabled module for the desired function actuated.

14. The computer of claim 13 wherein the means for sequentially enabling and disabling memory modules further includes means for restarting and sequential actuation of the enabling and disabling means to select another desired function.

15. A portable computer, comprising
   a processor;
   a plurality of connector slots for receiving at least memory modules containing application programs, each application program having the same starting address;
   a system bus coupling the connector slots to the processor;
   the processor including means for selectively enabling and disabling the memory modules received in the connector slots to select the memory modules necessary for the processor to execute only one application program of a plurality of application programs when a plurality of application program-containing memory modules are received in the connector slots by selectively enabling only the memory module or modules which contain the selected application program;
   the selectively enabled memory module or modules comprising memory addressed by the processor.

16. The computer of claim 15 wherein the processor includes means for storing data for an application program it is executing in a RAM module, selecting a new application program from among those contained in the memory modules received in the connector slots, and executing the new program utilizing the data stored in the RAM module.

17. The computer of claim 15 wherein the processor includes a RAM, a calculator, and a file system, means for switching between an application program being executed by the processor and one of the file system and calculator wherein data generated by the selected one of the calculator and file system can be selectively stored in the processor's RAM for use by the application program.

18. The computer of claim 15 wherein each connector slot has an enable terminal, the system bus has select lines coupled from the processor to the enable terminals of the connector slots, and the processor's means for selectively enabling and disabling the memory modules includes means for selectively actuating and deactuating the select lines to enable and disable the memory modules.

19. The computer of claim 18 wherein each application program memory module has a module identification block, the processor having means for interrogating the module identification block of an enabled memory module.

20. The computer of claim 18 wherein the system bus has a unique select line for each connector slot.

21. The computer of claim 20 wherein the processor's means for selectively actuating and deactuating the select lines includes means for sequentially actuating and deactuating the select lines to enable and disable, respectively, the memory modules received in the connector slots in some sequence to select the next application program to be executed, and the computer further including means for initiating the sequential actuating means.

22. The computer of claim 20 wherein each memory module has a module identification block, the module identification block including information related to the memory module, and the processor includes means for reading the information from the module identification block of an enabled memory module.

23. The computer of claim 22 wherein the module identification blocks for memory modules containing application programs include information indicating any additional memory modules which are needed by the application program and the processing means includes means for querying the module identification blocks of the selectively enabled memory modules to locate any needed additional memory modules, maintaining the select lines for the needed memory modules actuated, and generating an error indication should a needed memory module be missing.

24. The computer of claim 23 wherein the processor includes RAM, the processor further including means for storing data for an application program it is executing in the processor's RAM or in a RAM module, means for selecting a new application program from among the memory modules received in the connector slots and executing the new application program utilizing the data stored in the processor's RAM or the RAM module.

25. The computer of claim 15 and further including one or more memory modules containing an operating system program received in the connector slots and the processor's means for selectively enabling and disabling the memory modules includes means for selectively enabling the memory modules containing the operating system program at the same time the memory module or modules containing the selected application program are enabled.

* * * * *